United States Patent [19]

Eiffler

[11] Patent Number: 5,520,849

[45] Date of Patent: May 28, 1996

[54] ELECTRICALLY CONDUCTIVE POLYMER COMPOSITION

[75] Inventor: Jürgen Eiffler, Stade, Germany

[73] Assignees: The Dow Chemical Company; Deborah C. Dulude

[21] Appl. No.: 264,836

[22] Filed: Jun. 23, 1994

Related U.S. Application Data

[63] Continuation of Ser. No. 52,203, Dec. 17, 1992, abandoned, which is a continuation-in-part of Ser. No. 490,794, Mar. 8, 1990, Pat. No. 5,188,766, which is a continuation-in-part of Ser. No. 245,879, Sep. 16, 1988, abandoned.

[30] Foreign Application Priority Data

Mar. 8, 1989 [GB] United Kingdom ................ 89053391

[51] Int. Cl.$^6$ ................ H01B 1/20; C08F 8/34; C08F 8/40; C08F 8/44
[52] U.S. Cl. .................... 252/500; 428/407; 523/201; 523/206; 525/467; 525/203; 525/217; 525/133; 525/151; 525/185; 525/186; 525/189
[58] Field of Search .................... 252/500; 428/407; 523/201, 206; 525/467, 203, 217, 133, 151, 185, 186, 189

[56] References Cited

U.S. PATENT DOCUMENTS

| | | | |
|---|---|---|---|
| 2,923,701 | 2/1960 | Schuller et al. | 260/85.5 |
| 2,982,749 | 5/1961 | Friedrich et al. | 260/23 |
| 3,276,598 | 10/1966 | Michaels et al. | 260/500 |
| 3,284,393 | 11/1966 | Vanderhoff et al. | 260/29.6 |
| 3,288,770 | 11/1966 | Butler | 260/88.3 |
| 3,375,233 | 3/1968 | Harada et al. | 260/79.3 |
| 3,401,152 | 9/1968 | Wessling et al. | 260/78.4 |
| 3,706,677 | 12/1972 | Wessling et al. | 260/2 H |
| 3,968,037 | 7/1976 | Morgan et al. | 210/47 |
| 4,501,686 | 2/1985 | Hotta et al. | 252/500 |
| 4,567,250 | 1/1986 | Naarmann et al. | 528/423 |
| 4,569,734 | 2/1986 | Naarmann et al. | 204/78 |
| 4,585,581 | 4/1986 | Skotheim | 252/518 |
| 4,585,695 | 4/1986 | Ogasawara et al. | 428/364 |
| 4,604,427 | 8/1986 | Roberts et al. | 525/185 |
| 4,617,353 | 10/1986 | Myers | 525/245 |
| 4,665,129 | 5/1987 | Naarmann et al. | 525/186 |
| 4,710,401 | 12/1987 | Warren, Jr. et al. | 427/121 |
| 4,711,111 | 9/1988 | Tieke et al. | 525/182 |
| 4,724,053 | 2/1988 | Jasne | 204/59 R |
| 4,731,311 | 3/1988 | Suzuki et al. | 429/213 |
| 4,731,408 | 3/1988 | Jasne | 524/458 |
| 4,804,594 | 2/1989 | Jow et al. | 429/194 |
| 5,069,820 | 12/1991 | Jen et al. | 252/500 |
| 5,160,457 | 11/1992 | Elsenbaumer | 252/500 |
| 5,188,766 | 2/1993 | Eiffler | 252/500 |
| 5,206,297 | 4/1993 | Wernet et al. | 525/279 |
| 5,215,848 | 6/1993 | Ikeda et al. | 430/108 |
| 5,281,363 | 1/1994 | Shacklette et al. | 252/500 |

FOREIGN PATENT DOCUMENTS

| | | |
|---|---|---|
| 1269194 | 5/1990 | Canada . |
| 0101894 | 3/1984 | European Pat. Off. . |
| 0104726 | 4/1984 | European Pat. Off. . |
| 0123827 | 11/1984 | European Pat. Off. . |
| 0167798 | 1/1986 | European Pat. Off. . |
| 0229992 | 7/1987 | European Pat. Off. . |
| 0229993 | 7/1987 | European Pat. Off. . |
| 147949 | 4/1981 | Germany . |
| 8400850 | 3/1986 | Sweden . |
| 1037028 | 7/1966 | United Kingdom . |
| 1084540 | 9/1967 | United Kingdom . |
| 2134125 | 8/1984 | United Kingdom . |
| 2210044 | 6/1989 | United Kingdom . |

OTHER PUBLICATIONS

Dutch patent application 6,505,750 (Dec. 30, 1965).
Chemical Abstract, vol. 106, 1987, 106:6150c.
A. F. Diaz et al., J.C.S. Chem. Comm., 1979, pp. 635–636.
E. A. Bekturov et al., Makromol. Chem. 186, pp. 71–75 (1985).
K. C. Khulbe et al., J. Polymer Science: Polymer Chem. Edition, vol. 20, pp. 1089–1095 (1982).
S. P. Armes, Synthetic Metals, 20 (1987) pp. 365–371.
J. Chiang et al., Synthetic Metals, 13 (1986) pp. 193–205.
R. B. Bjorklund et al., J. Chem. Soc., Chem. Commun., 1986, pp. 1293–1295.
S. P. Armes et al., J. Chem. Soc., Chem. Commun., 1987, pp. 288–290.
P. Aldebert et al., J. Chem. Soc., Chem. Commun., 1986, pp. 1636–1638.
R. Yosomiya et al., Makromol. Chem., Rapid Commun. 7, pp. 697–701 (1986).
M. A. De Paoli et al., J. Chem. Soc., Chem. Commun., 1984, pp. 1015–1016.
O. Niwa et al., J. Chem. Soc., Chem. Commun., 1984, pp. 817–818.

*Primary Examiner*—Douglas J. McGinty

[57] ABSTRACT

New electrically conductive polymer compositions comprise i) an electrically conductive polymer a) of one or more oxidatively polymerizable aromatic compounds and ii) a polymer d) having ammonium, phosphonium or sulfonium groups in the polymer chain(s).

The polymer compositions comprising polymers a) and d) are prepared by oxidative polymerization of one or more aromatic compounds in the presence of a polymer b) having ammonium, phosphonium or sulfonium groups in the polymer chain(s) and containing a polydentate anionic complex which has a redox potential sufficient for enabling oxidative polymerization of the aromatic compounds. Said polymer b) which has a non-metallic anionic complex such as $S_2O_8^{2-}$ is also novel.

10 Claims, No Drawings

ELECTRICALLY CONDUCTIVE POLYMER COMPOSITION

CROSS-REFERENCE TO RELATED APPLICATION

This is a continuation of application Ser. No. 08/052,203, filed Dec. 17, 1992, now abandoned, which is a continuation-in-part of my U.S. patent application, Ser. No. 07/490,794, filed Mar. 8, 1990, now U.S. Pat. No. 5,788,766, which is a continuation-in-part of my abandoned U.S. patent application, Ser. No. 245,879, filed Sept. 16, 1988, abandoned.

BACKGROUND OF THE INVENTION

Electrically conductive polymers are the focus of considerable interest as they are possible replacements for metallic conductors or semi-conductors in a wide variety of applications such as in batteries, in photovoltaics, and in electrostatic dissipation and electromagnetic shielding uses.

Known methods of preparing electrically conductive polymers include an oxidative polymerization of aromatic compounds such as pyrrole or aniline.

The oxidative polymerization can be carried out electrochemically or by means of a chemical oxidizing agent. The electrically conductive polymers are prepared in the form of powders, coatings or free-standing films.

It is also known to carry out the oxidative polymerization in the presence of a carrier whereby an electrically conductive polymer composition of the aromatic polymer and the carrier material is produced. The known methods are discussed below in more detail.

It is well known that polypyrrole can be synthesized through electrochemical oxidative polymerization of pyrrole (A. F. Diarz et al., J.C.S., Chem. Comm., 1979, pages 635 and 636). Unfortunately, the mechanical properties of the produced polypyrrole coatings or films are often unsatisfactory unless special care is taken to chose the proper type of solvents or conducting salts such as aromatic sulfonic, disulfonic or oligosulfonic acids disclosed in DE-A-34 21 296 and DE-A-33 18 857.

It is also known that pyrrole can be polymerized chemically, for example with potassium peroxydisulfate, potassium permanganate, sodium perborate, iron(III) chloride or potassium bichromate in the absence or presence of a conducting salt, (K. C. Khulbe and R. S. Mann, Journal of Polymer Science, Vol. 20, pages 1089 et seq., 1982, S. P. Armes, Synth. Met., 20 (1987), pages 365–371, and DE-A-3325892). It is also known to produce electrically conductive polyaniline powder through oxidative polymerization using chemical oxidizing agents such as persulfate anions (J. C. Chiang et al., Synth. Met. 13 (1986), pages 193 et seq.

From DE-A-3307954 it is known that electrically conductive pyrrole polymers having small particle sizes can be obtained by electrochemical polymerization of pyrrole in the presence of carriers of small size. The carriers contain acidic groups; exemplary of the carriers are sulfonated polystyrene and aluminum oxides.

GB-A-2 134 125 relates to the electropolymerization of pyrrole. A redox species such as potassium ferricyanide can be additionally used.

In various scientific articles it has been suggested to prepare electrically conductive polypyrrole particles by polymerizing pyrrole in an aqueous solution using $FeCl_3$ as an oxidizing agent in the presence of dissolved methylcellulose, poly(vinyl pyrrolidone) poly(ethylene oxide) or poly(vinyl-alcohol-co-acetate) which acts as a steric-stabilizer (S. P. Armes et al., J. Chem. Soc., Chem. Commun., 1987, pages 228–290 and R. B. Bjorklund et al., J. Chem. Soc., Chem. Commun., 1986, pages 1293–1295).

DE-A-34 09 462 discloses electrically conductive thermoplastic mixtures of macromolecular compounds and polypyrrole having a small particle size. The macromolecular compounds are polyolefins, styrenic polymers, vinyl chloride polymers, polyamides, polyesters, polyacetales or polyethers. The thermoplastic mixtures are produced by treating a solution of the macromolecular compounds and pyrrole with an oxidizing agent, such as a peroxo acid or a salt thereof.

EP-A-0 229 992 relates to the oxidative polymerization of pyrrole, thiophene, aniline salts etc. with a chemical oxidizing agent such as a perborate, persulfate or percarbonate in the presence of a polymer having anionic surface character. This polymer is dispersed in the reaction medium, for example water, and acts as a polymeric counter-ion for the polymer produced by oxidative polymerization. The polymer having anionic surface character contains strong ionic groups, such as sulfate or sulfonate groups, in the polymer chain. EP-A-0 229 993 relates to the electropolymerization of pyrrole in the presence of a polymer having anionic surface character. This polymer is dispersed in the reaction medium, for example water, and acts as a polymeric counter-ion for the polymer produced by electrochemical oxidation. The same polymers having anionic surface character are mentioned as in EP-A-0 229 92.

EP-A-0 104 726 discloses a polymer composition comprising an electrically conductive polymer associated with a polymeric dopant which stabilizes the polymer in an electrically conductive state. Negatively charged dopants (counter-ions) are used for polypyrrole. These dopants have negatively charged groups in the polymer chain(s). Exemplary thereof are ionizable polysulfonates or polycarboxylates. The electrically conductive polymer is produced by polymerizing a corresponding monomer in the presence of the polymeric dopant and an oxidizing agent. The oxidizing agent may be bonded to the polymeric dopant. The ferric salt of a sulfonated polystyrene is suggested.

Although electrically conductive polymer compositions in powder form are useful in several applications, for example as antistatic fillers for polymers, it is often desirable to produce films or coatings from the electrically conductive polymer compositions. DE-A-3227914 discloses pressing pyrrole polymers at a temperature between 150° C. and 300° C. and a pressure of at least 50 bar; however, this method is rather inconvenient for preparing films or coatings.

Accordingly, others have suggested preparing composite films of polypyrrole and PVC, polyimides, polystyrenes and polymethacrylates (O. Niwa et al., J. Chem. Soc., Chem. Commun., 1984 pages 817 and 818; M.-A. De Paoli et al., J. Chem. Soc., Chem. Commun., 1984 pages 1015 and 1016 and EP-A-191726). In Chemical Abstracts 106 (2):6150c providing an abstract of JP61/123638 it is suggested to soak a PVC film containing aniline with an ammonium persulfate solution. However, these methods are quite complicated and time consuming.

DE-A-3419788 discloses electrically conductive copolymers and blends of polymers which are composed of a polymer component A without a conjugated pi-system and a polymer component B with a conjugated pi-system such as polypyrrole, polythiophene or polyaniline. The disclosed examples of component A are polyvinylchloride (PVC), polybutadiene, polyacrylate, polymethacrylate, copolymers of maleic acid anhydride and styrene, copolymers of butadiene and styrene, chloromethylated polystyrene or polymers which are functionalized with a —NH$_2$ or —OH group such as poly-(p-aminostyrene) or polyvinylamine which contain redox-active groups which have in the oxidized or reduced state an active potential which is sufficient for oxidation or reduction of component B. As redox-active groups are disclosed complexes or chelates of transition metals, benzoquinone or ferrocene. Unfortunately, the polymer component A has to be functionalized in several steps in order to incorporate the redox-active groups.

U.S. Pat. No. 4,604,427 discloses a method of impregnating a non-porous, swellable or soluble polyamide, polyvinyl chloride, polycarbonate, polyvinyl acetate or polyurethane with pyrrole or aniline and with a chemical oxidant such as ammonium persulfate or iron trichloride. Powders or films are obtained.

U.S. Pat. No. 4,617,353 discloses a process wherein a solution of an electrically non-conducting polymer such as PVC, butadiene copolymer or an olefin-homo- and copolymer is formed in a nonhydrous liquid reaction medium and a pyrrole monomer is contacted in situ with a polymerization initiator selected from the group consisting of anhydrous halides of iron, cobalt or nickel.

R. Yosomiya, Makromol. Chem., Rapid Commun. 7, pages 697 to 701 (1986) discloses that poly(vinyl alcohol), poly(methyl methacrylate) and poly(vinyl chloride) are dissolved in an appropriate solvent together with $CuCl_2$ or $FeCl_3$, the solution is cast on a glass plate and dried to form a film which is then reacted with pyrrole.

Unfortunately, the oxidant or polymerization initiator is inhomogenously distributed in the films prepared according to these processes and the mechanical properties of the films are often insufficient.

P. Aldebert et al., J. Chem. Soc., Chem Commun., 1986, pages 1636 to 1638 disclose polymer alloys with mixed electronic and ionic conductivity which have been synthesized from perfluorosulfonated ionomer membranes and monomer precursors of electronically conducting polypyrrole or polyaniline. A commercially available solid acidic Nafion (Trademark) film is soaked in an aqueous solution containing 2M $Fe(ClO_4)_3$ and 0.5 M $HClO_4$. The proton sites of the Nafion film are exchanged by iron(III) ions. The Nafion film is produced from an ionomeric polymer containing $SO_3$ group. Polymerization of aniline inside the ionic membrane is obtained by soaking the $Fe^{3+}$ exchanged Nafion in a 1M aqueous solution of aniline acidified with $H_2SO_4$ or $HClO_4$.

Due to the interesting properties and the variety of applications of the electrically conductive pyrrole or aniline polymer compositions and due to the limited choice of oxidizing agents and processes which are useful for producing electrically conductive pyrrole or aniline polymers in the form of a film or coating, it remains desirable to provide a new electrically conductive polymer composition comprising polypyrrole, polythiophene, polyaniline or similar polymers which polymer composition can be produced in the form of a film or a coating but also in the form of a powder or granules. Furthermore, it remains desirable to provide a new oxidizing agent and a new process useful for producing such electrically conductive polymer composition.

Surprisingly, it has been found that certain types of polymeric oxidizing agents are useful in the oxidative polymerization of aniline, pyrrole and other aromatic compounds and that the reduced form of the oxidizing agent forms a portion of the electrically conductive polymer composition.

SUMMARY OF THE INVENTION

Accordingly, one aspect of the present invention is an electrically conductive polymer composition comprising
i) an electrically conductive polymer a) of one or more oxidatively polymerizable aromatic compounds and
ii) a polymer d) having ammonium, phosphonium or sulfonium groups in the polymer chain(s).

The above-mentioned electrically conductive polymer composition is produced by oxidative polymerization of one or more aromatic compounds in the presence of a polymer b) having ammonium, phosphonium or sulfonium groups in the polymer chain(s) and containing a polydentate, anionic complex which has a redox potential sufficient for enabling oxidative polymerization of said aromatic compound(s).

Another aspect of the present invention is a polymer having ammonium, phosphonium or sulfonium groups in the polymer chain(s) which polymer is cross-linked via polydentate, anionic non-metallic complexes which have a redox potential sufficient for enabling oxidative polymerization of pyrroles, thiophenes or anilines.

The above-mentioned electrically conductive polymer composition of the present invention is useful in an electrical conductor or semi-conductor, an electrode material, a plastic material or a paper provided with an antistatic finishing, an electromagnetic shielding material, an electrical cell, a heating element or an electrochemical membrane.

Yet another aspect of the present invention is a polymer containing the above-mentioned electrically conductive polymer composition in powder form as an antistatic filler.

DETAILED DESCRIPTION OF THE INVENTION

The electrically conductive polymer composition of the present invention comprises
i) an electrically conductive polymer a) containing one or more oxidatively polymerizable aromatic compounds in polymerized form and
ii) a polymer d) having ammonium, phosphonium or sulfonium groups in the polymer chain(s).

The electrically conductive polymer composition is produced by oxidative polymerization of the aromatic compound(s) in the presence of a polymer b) containing a polydentate anionic complex which has a redox potential sufficient for enabling oxidative polymerization of the aromatic compound(s). Polymer b) has the same ammonium, phosphonium or sulfonium groups in the polymer chain(s) as polymer d).

Polymer b) is described in the following paragraphs in detail. The polydentate anionic complexes which have a redox potential sufficient for enabling oxidative polymerization of the aromatic compounds may be metallic complexes such as $MnO_4^-$, $Cr_2O_7^{2-}$ or $[Fe(CN)_6]^{3-}$. However, non-metallic complexes are preferred, typically those wherein the following elements are the main elements of the complex: elements of group IIIA, such as boron, of group VA, such as nitrogen or phosphorous, or of group VIA, such as oxygen or sulfur, of the Periodic Table of Elements. Exemplary thereof are $S_2O_8^{2-}$, $B_4O_7^{2-}$ and $ClO_4^-$, with $S_2O_8^{2-}$ being the most preferred complex.

The non-metallic polydentate anionic complexes are preferred over the polydentate anionic metal complexes. For example, unlike complexes containing heavy metal ions, they are not subject to ecological discussions.

Polymers which are cross-linked with polydentate, anionic metallic complexes are known. From E. A. Bekturov, "Interaction of poly(diallyldimethylammonium chloride) with ferro- and ferricyanide anions", Macromol Chem 186/71–75 (1986) and DD-A-147 949 it is known to react a poly(diallyldialkylammonium chloride) with metallic complexes such as $MnO_4$— or $Fe(CN)_6^{3-}$. In DD-A-147 949 it is suggested to make use of this reaction in waste water treatment. However, the usefulness of such polymers being cross-linked with polydentate, anionic metal complexes for preparing electrically conductive polymer compositions according to the processes of the present invention is not known.

The standard half cell potential of the polydentate anionic redox system is preferably more than +0.1 Volt, more preferably more than +0.8 Volt, most preferably more than +1.2 Volt, depending on the type of the aromatic compound(s) to be polymerized, i.e. on the type of monomeric precursor(s) of polymer a). It is important that the anion not only has a redox potential sufficient for enabling oxidative polymerization of the monomeric precursor(s) of polymer a) but that it is also a polydentate complex. The expression "polydentate complexes" includes bidentate, tridentate, etc. complexes. The anionic complexes are mono- or polyvalent, preferably mono- to trivalent, more preferably divalent. Most preferably, polymer b) contains anionic polynuclear complexes which contain several coordination centers linked together with bridge ligands or metal to metal bonds. The polydentate anionic complexes cause cross-linking of the polymer.

Depending on the way of producing polymer b) it can be obtained in the form of a film or a coating if it contains these polydentate anionic complexes. Without wanting to be bound to a particular theory, it is believed that the polydentate anionic complexes cause cross-linking of the polymer whereby films or coatings are obtained. As described further below, the polymer b) can also be obtained in the form of a powder which has an average particle size of 5 nm to 1 mm, generally of 10 nm to 0.1 mm, preferably of 100 nm to 0.1 mm and more preferably of 500 nm to 0.01 mm.

Polymers b) which are cross-linked via the above mentioned non-metallic complexes such as $S_2O_8^{2-}$ or $ClO_4^-$ are novel and are one aspect of the present invention.

Polymer b) has phosphonium or sulfonium groups or, preferably, ammonium groups in the polymer chain(s). These groups may be located in the main chain and/or in the side chain(s) of the polymer. By the term "a polymer b) having phosphonium, sulfonium or ammonium groups" are also meant polymers which have phosphonium and sulfonium groups or phosphonium and ammonium groups or sulfonium and ammonium groups or phosphonium, sulfonium and ammonium groups.

The polymers b) can be prepared from known water-soluble polymers c) which contain the same ammonium, phosphonium or sulfonium groups as polymer b) but which contain monodentate anions, for example hydroxyl, halogen such as bromide, fluoride or chloride ions, tetraflouroborate, phosphate, nitrate, sulfate, $HSO_4^-$ or organic anions, such as acetate or the anion of benzene sulfonic acid or p-styrene sulfonic acid, by exchanging these monodentate anions with polydentate anionic complexes having the desired redox potential such as $S_2O_8^{2-}$, $ClO_4^-$, $Cr_2O_7^{2-}$, $MnO_4^-$ or $[Fe(CN)_6]^{3-}$ and cross-linking the polymer. The anion exchange however does not occur when the polydentate anionic complexes such as $S_2O_8^{2-}$ are contacted with a monomeric precursor of polymer b).

Preferred ammonium, phosphonium and sulfonium groups in polymers b) and c) are

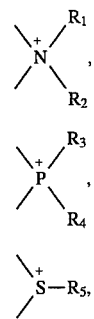

wherein $R_1$ and $R_2$ independently are hydrogen, alkyl, such as a $C_{1-6}$-alkyl, preferably methyl, ethyl, the propyl, butyl, pentyl or hexyl groups, for example n-propyl or isopropyl, primary, secondary or tertiary butyl, neopentyl or n-hexyl, aralkyl, such as benzyl, or phenyl or wherein $R_1$ and $R_2$ are joined together to represent the atoms required to complete a heterocyclic ring, such as piperidine, pyrrolidine, or morpholine, e.g. $—(CH_2)_5—$, $—(CH_2)_4—$, or $—(CH_2)_2O(CH_2)_2—$ and wherein $R_3$ and $R_4$ independently are alkyl, such as a $C_{1-6}$-alkyl, preferably methyl, ethyl, the propyl, butyl, pentyl or hexyl groups, for example n-propyl or isopropyl, primary, secondary or tertiary butyl, neopentyl or n-hexyl, monocyclic aryl, such as phenyl, or monocyclic aryl-alkyl, such as benzyl and wherein $R_5$ is alkyl, such as a $C_{1-6}$-alkyl, preferably methyl, ethyl, the propyl, butyl, pentyl or hexyl groups, for example n-propyl or isopropyl, primary, secondary or tertiary butyl, neopentyl or n-hexyl, or monocyclic aryl-alkyl, such as benzyl.

If $R_1$, $R_2$, $R_3$, $R_4$ and/or $R_5$ is or contains an alkyl radical, the alkyl radical preferably is methyl or ethyl.

The radicals $R_1$, $R_2$, $R_3$, $R_4$ and/or $R_5$ should be chosen in such a manner that polymer c) is soluble in water to a substantial extent.

The preferred polymers b) and c) are homo- or copolymers produced from one or more monomers of Formula

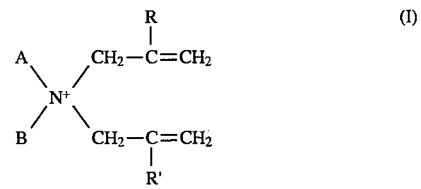

wherein

A and B are the same or different and represent a $C_{1-12}$-alkyl or phenyl radical, the $C_{1-12}$-alkyl or phenyl radical can be unsubstituted or substituted with a substituent which is not polymerizable in the presence of a free radical initiator; or A and B together represent $—CH_2—CH_2—$, $—CH(CH_3)—CH(CH_3)—$, $—CH=CH—CH=CH—$, $—CH=CH—CH=N—$, or $—CH=CH—N=CH—$; and R and R' are the same or different and represent hydrogen, nitro-$C_{1-6}$—alkyl, $C_{1-6}$—alkyl or phenyl radicals, the alkyl or phenyl radicals are optionally substituted by hydroxy, amido, loweralkoxy, phenoxy, naphthoxy, cyano, thioloweralkoxy, thiophenoxy, loweralkoyl or 5- or 6-membered cycloalkyl and which polymers b) and c) contain the above mentioned anions.

Preferred substituted $C_{1-12}$-alkyl or phenyl radicals A or B each independently are substituted by hydroxy, amido, loweralkoxy, phenoxy, naphthoxy, cyano, thioloweralkoxy, thiophenoxy, loweralkoyl, 5- or 6-membered cycloalkyl, or represent a nitro substituted $C_{1-12}$-alkyl group. The alkyl groups A and B each independently have 1 to 12, preferably 1 to 8 carbon atoms, such as, for example, methyl, ethyl, propyl, isopropyl, n-, s- or t-butyl, pentyl, 2-ethyl-hexyl, octyl or dodecyl groups. Preferably, lower alkyl groups A and B when they are substituted, each independently represent hydroxymethyl, hydroxyethyl or ethoxyethyl groups. Preferably, unsubstituted lower alkyl groups A and B each independently are methyl or ethyl.

Suitable groups R and R' independently are hydrogen, $C_{1-6}$-alkyl, preferably methyl, ethyl, the propyl, butyl, pentyl or hexyl groups, for example n-propyl or isopropyl, primary, secondary or tertiary butyl, neopentyl or n-hexyl, or phenyl radicals, the alkyl or phenyl radicals are optionally substituted by the groups indicated above.

Preferably R and R' each independently represent $C_{1-6}$-alkyl, more preferably methyl or ethyl, or hydrogen.

"Lower" alkyl, alkoyl or alkoxy means alkyl, alkoyl or alkoxy groups having from 1 to 3 carbon atoms, preferably 1 or 2 carbon atoms, such as methyl, ethyl, methanoyl, ethanoyl, methoxy or ethoxy.

The most preferred polymers b) are homo- or copolymers of one or more monomers of formula I wherein A and B each independently represent methyl, ethyl or unsubstituted phenyl, preferably methyl; and R and R' independently are hydrogen or methyl, and which polymers are cross-linked with $S_2O_8^{2-}$ anions.

Further useful polymers b) are homo- or copolymers of one or more monomers of formula II

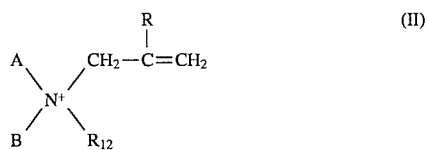

(II)

which polymers are cross-linked with anions of the above mentioned types, and A, B and R have the above mentioned meanings and $R_{12}$ represents hydrogen or has one of the meanings stated for A.

The monomers of formula I or II can also be copolymerized with minor amounts of any other monomer copolymerizable therewith, for example with acrylonitrile, styrene, acrylamide or vinyl acetate. Such other monomers preferably are used in an amount of less than 50 percent, more preferably up to 20 percent, most preferably up to 10 percent, based on the total weight of the polymer. If such other monomers are used, their amounts should be chosen in such a manner that polymer c), containing monodentate anions, such as hydroxyl or chloride, is water-soluble.

Further useful polymers b) are the polymers disclosed in U.S. Pat. Nos. 3,401,152 and 3,706,677 which contain sulfonium groups, for example poly (p-xylylene-α-dimethylsulfonium chloride), polymeric p-phenylene dimethylene bis(dimethyl sulfonium chloride), polymeric 2,5-dimethyl-p-phenylene dimethylene bis(diethyl sulfonium chloride), polymeric p-phenylene dimethylene bis (diethyl sulfonium chloride) and polymeric p-phenylene dimethylene bis (di-n-butylsulfonium chloride).

Specific examples of known polymers c) which are useful for preparing the cross-linked polymer b) are poly(dimethylammoniono)-1,6-hexylene bromide, poly(2-acryloxyethyldimethylsulfonium chloride), poly(glycidyltributyl phosphonium chloride), poly(acryloxyethyl trimethyl ammonium chloride), poly(methacryloxyethyl trimethyl ammonium chloride), poly(vinyl benzyltrimethyl ammonium chloride), poly(methyl(vinyl pyridinium)-ammonium chloride), poly(3-methacryloxyl(2-hydroxy-propyl)trimethyl ammonium chloride), poly(3-acrylamido-3-methylbutyl trimethyl ammonium chloride), poly(alpha-(methylene trimethyl ammonium chloride)-ethylene oxide), poly(dimethyl propyl ammonium chloride), quaternized poly(2- or 4-vinylpyridine), quaternized polyethyleneimine, poly(vinyl methyl pyridinium chloride) or quaternized poly-(dimethylaminoethyl methacrylate) or copolymers of the monomeric precursors of the above mentioned polymers with vinyl monomers, in particular copolymers of vinylpyridine/styrene, vinylpyridine/butadiene, vinylpyridine/styrene/butadiene-terpolymers, the vinylpyridine-moieties being converted into their salt form by treatment with acids, preferably inorganic acids or being in their quaternized form. Terpolymers having poly(vinylbenzyltrimethylammonium chloride)/ styrene/butadiene units or terpolymers having poly(acryloxyethyltrimethyl ammonium chloride) or poly(methacryloxyethyltrimethyl ammonium chloride) units instead of poly(vinylbenzyltrimethyl ammonium chloride) are also useful. The most preferred copolymers or terpolymers are those having the moieties such as the quaternized vinylpyridine or vinylbenzyltrimethyl ammonium chloride in an amount of 1 to 50 percent and butadiene in an amount of 20 to 70 percent, based on the polymer weight, any remaining polymer portion being copolymerized styrene. Mixtures of a polymer C), preferably of a poly(diallyldialkyl ammonium halide) with a polymer dispersion are also useful for preparing the electrically conductive polymer composition of the present invention and are also included in the definition of "the polymer c)". Preferred polymer dispersions are known aqueous dispersions of the polystyrene, polystyrene/butadiene or carboxylated polystyrene/butadiene type which are generally known as adhesives or pigment binders. The mixtures preferably contain from 1 to 50 percent, more preferably from 10 to 40 weight percent of the polymer c).

The polymers c) having cationic groups of the type disclosed above and having monodentate anions are known in the art. The polymers c) are for example described in U.S. Pat. Nos. 2,923,701 and 3,968,037 and in British patents 1,037,028 and 1,084,540 and in Belgium patent 664427. These known polymers are typically linear and usually soluble or swellable in water to a substantial extent. They can be produced according to known polymerization processes in aqueous solution or according to emulsion or suspension polymerization. Solution polymerization is described in U.S. Pat. No. 3,288,770. Emulsion polymerization and suspension polymerization are described in U.S. Pat. Nos. 3,284,393 and 2,982,749. From published Dutch patent application 6505750 radical-type polymerization of diallyldimethylammonium chloride in the presence of a persulfate catalyst is known. However, the radical-type polymerization does not provide cross-linked polymers containing persulfate anions.

As mentioned above, the polymers c) are preferably linear. However, it is also possible to start from known polymers of the above mentioned types which have been cross-linked with difunctional or trifunctional non-ionic monomers, for example diallylamine, triallyamine, divinylpyridine, ethylene glycol diacrylate, divinylbenzene, diallylphthalate, diallylfumarate or trivinylbenzene. These products can be slightly cross-linked and still substantially water-soluble. The polymers c) can contain up to 15 weight percent of the monomeric precursor. However polymers c) preferably contain less than 5 weight percent, more preferably less than 0.2 weight percent.

The polymer c) used for preparing polymer b) by anion exchange and cross-linking should generally have a weight average molecular weight $M_n$ of more than 20,000, preferably from 50,000 to 5,000,000 and more preferably from 200,000 to 1,500,000.

A suitable polymer b) containing polydentate anionic complexes can be produced by exchanging at least a portion of the anions in a known polymer c) described above with the polydentate anionic complexes described above, $S_2O_8^{2-}$ being the most preferred one. When the polydentate anionic complex is a permanganate anion, for example in the form of an aqueous potassium permanganate solution, such aqueous solutions preferably contain traces of an acid.

The following description of the preparation of polymer b) is illustrated using the $S_2O_8^{2-}$-(peroxodisulfate) anion although the useful types of anions are not restricted thereto.

In the practice of preparing polymer b), the water-soluble polymer c) is preferably reacted with peroxodisulfuric acid or a peroxodisulfate salt at a temperature of from about $-20°$ C. to about $+40°$ C., preferably from about $-20°$ C. to about $+25°$ C., more preferably at about ambient temperature. For the ionic cross-linking with peroxodisulphate, solutions of peroxodisulphuric acid or its ammonium, alkali or alkaline earth metal salts, for example the tetrabutylammonium, sodium or potassium salts, are preferred. The acid or the salt may be dissolved in an organic solvent but an aqueous solution is preferred. The concentration of peroxodisulfuric acid or a salt thereof is not very critical. It can be in the range of from about 0.01 weight percent, preferably of from about 0.1 weight percent up to a saturated aqueous solution. Polymer b) can either be produced in the form of a film or a coating as described in methods A to D below or in the form of a powder or granules as described in methods E to H below.

In a first method A for producing a polymer b), a solution of an above-mentioned known polymer c) which typically contains monodentate anions such as halogen, preferably chlorine, is applied to a substrate such as a glass plate. Aqueous solutions which contain from 0.1 to 25 weight percent of polymer c), more preferably from 1 to 20 weight percent of polymer c), most preferably from 1 to 10 weight percent of polymer c) are preferred. Solutions of polymer c) in an organic solvent are less preferred. The solution of polymer c) and the substrate are then dipped into an above described solution which contains peroxodisulphate ions. The solution of polymer c) can, for example, be simply poured on a glass plate which is then dipped into the solution containing peroxodisulphate ions. An aqueous solution containing about 5 to about 20 weight percent of $Na_2S_2O_8$ is preferred. The anion exchange between the monodentate anion, such as chloride, and the peroxodisulphate ion and the cross-linking usually take place within a couple of minutes. The polymer b) containing peroxodisulphate ions is deposited on the substrate in the form of a solid, water-insoluble film.

In a further method B, a film produced from a known above described polymer c) is dipped into the above described solution containing peroxodisulphate ions. An aqueous solution containing about 5 to about 20 weight percent of $Na_2S_2O_8$ is preferred. The film of the polymer c) can be produced by evaporating corresponding solutions of polymer c) which are preferably in contact with a substrate such as a glass plate. This method is particularly useful when employing the above mentioned cross-linked polymeric starting materials c). The ion exchange and cross-linking reaction typically takes up to about two hours for films having a thickness of up to about 0.5 mm.

Films of polymer b) can also be produced according to a process C which is analogous to the process described in U.S. Pat. No. 3,276,598. In this process aqueous solutions of the polymeric starting material c) and of the peroxodisulphate ion are placed in two chambers which are separated from each other with a filter paper or another material having fine pores. This method is particularly suitable for producing very thin films of less than 0.1 mm. Solutions containing from 0.1 to 25, more preferably from 0.5 to 5 weight percent of polymer c) and solutions containing from 0.1 to 70, more preferably from 1 to 20 weight percent of a peroxodisulphate salt are preferred.

In a further method D, the above mentioned film of the known polymer c) is Sprayed with the above described aqueous solutions containing peroxodisulphate ions. An aqueous solution containing about 5 to about 20 weight percent of $Na_2S_2O_8$ is preferred.

In a further method E, a solution of the known polymer c) is added drop by drop to the above-mentioned peroxodisulphate solution. The polymeric solution preferably contains from about 0.1 to about 25 weight percent, more preferably from about 0.5 to about 10 weight percent of polymer c). The peroxodisulphate solution preferably comprises from about 0.1 to about 70 weight percent, more preferably from about 0.5 to about 20 weight percent of a peroxodisulphate salt. Granules are obtained which can be ground to a powder if desired.

A further method F involves suspending a known solid polymer c) in a peroxodisulphate solution. This method is particularly useful for polymers produced according to suspension polymerization and for polymers which have been cross-linked with a multivalent nonionic monomer of the above mentioned type.

According to the following methods G and H, polymer b) is obtained in the form of fine particles by reacting a polymer c) and peroxodisulphate ions in an aqueous solution. The produced particles of polymer b) have an average size of 5 nm to 1 mm, generally of 10 nm to 0.1 mm, preferably of 100 nm to 0.1 mm and more preferably of 500 nm to 0.01 mm. The concentration of the water-soluble polymer c) in the aqueous solution is critical for obtaining a cross-linked polymer b) in the form of fine particles having the above-mentioned size. Polymer c) should generally be dissolved in water in a concentration of 0.01 to 5 percent, preferably of 0.5 to 2 percent, based on the weight of the aqueous solution. If the concentration of polymer c) is too high, the produced water-insoluble polymer b) precipitates from the solution in relatively large flocs. Polymer c) can be added to an aqueous solution of the peroxodisulfuric acid or a salt thereof or vice versa. Generally the solution is stirred during the addition, preferably at 300 rpm or more, more preferably at 400 rpm to 600 rpm (revolutions per minute).

According to method G of producing polymer b), the molar ratio between the ammonium, phosphonium or sulfonium groups in polymer c) and the peroxydisulfate ions is 2:1 or more, preferably from 2:1 to 2.5:1. The cross-linked polymer b) containing $S_2O_8^{2-}$ groups is then produced in the form of fine, white particles. The liquid phase of the aqueous dispersion containing the fine particles of the water-insoluble polymer b) does not contain substantial amounts of peroxodisulfate anions anymore, typically less than 3 percent, in many cases even less than 1 percent, of the original amount of dissolved peroxodisulfate anions. The produced aqueous dispersion of polymer b) can be directly used for producing the electrically conductive polymer a) as described below. The direct use of the aqueous dispersion is particularly useful when preparing polymer b) in the form of very fine particles which can not be separated from the water anymore. When polymer b) is obtained in larger particles, it can be separated from the water if desired, for example by filtration.

According to method H of producing polymer b), the molar ratio between the ammonium, phosphonium or sulfonium groups in polymer c) and the peroxydisulfate ions is less than 2:1, preferably from 0.001:1 to 1.98:1, more preferably from 0.01:1 to 1.9:1, most preferably from 0.2:1 to 1.5:1. The produced waterinsoluble polymer b) in the form of fine, white particles can be separated from the water, for example by filtration.

The polymer b) produced according to method E to H above can be washed, for example with water and/or methanol, and dried, for example under vacuum at 20° to 35° C., preferably at ambient temperature The produced polymer b) is cross-linked with $S_2O_8^{2-}$ groups at a molar ratio of cationic groups, such as ammonium, sulfonium or phosphonium groups, to $S_2O_8^{2-}$ groups of 2:1.

According to the above described methods A to H, polymers b) are obtained in which more than 50 percent, preferably more than 80 percent and more preferably more than 95 percent of the total anion content are the above described polydentate anionic complexes depending, among others, on the concentration of the salt solutions comprising these anions in methods A to H.

In some cases it is useful to carry out the process for producing polymer b) in an aqueous solution wherein conducting salts are dissolved. Conducting salts are generally known. Preferred salts are alkali or ammonium salts which have anions of the following type: $BF_4^-$, $PF_6^-$, $AsF_6^-$, $SbCl_6^-$, $ClO_4^-$, $IO_4^-$, $HSO_4^-$, $SO_4^{2-}$, $CF_3SO_3^-$, $CH_3C_6H_4SO_3^-$, $CF_3COO^-$, $HC_2O_4^-$, $ZrF_6^{2-}$, $TiF_6^{2-}$, $C_{1-12}$-alkylsulfate, $C_{1-12}$-alkylsulfonate, $C_{1-12}$-alkylphosphate or $C_{1-12}$-alkylphosphonate.

The aqueous solution preferably contains the conducting salt in an amount of from 0.001 to 10 mols per liter, more preferably from 0.01 to 1 mol per liter. Preferred cations are sodium, potassium, ammonium or tetrabutylammonium ions. Instead of the salts, acids such as sulphuric acid are also useful. A preferred type of aqueous solution are mixtures of water and methanol containing the above mentioned salts.

Polymer b) is a solid oxidizing agent for carrying out the oxidative polymerization of aromatic compounds according to the processes described below wherein the electrically conductive polymer compositions of the present invention are produced.

Polymer compositions are obtained which contain the electrically conductive polymer a) and a polymer d) having ammonium, phosphonium or sulfonium groups in the polymer chain(s). The polymer d) is the reduced form of polymer b) (which has been used as an oxidizing agent). Polymer d) contains the same ammonium, sulfonium or phosphonium groups in the polymer chain(s) as polymer b) and the reduced form of the polydentate, anionic complexes. If polymer b) contains $S_2O_8^{2-}$ complexes, polymer d) contains sulfate groups.

Typical examples of a polymer a) having one or more aromatic compounds in polymerized form are polymers containing aromatic rings, furane, aniline, pyrrole and/or thiophene units, such as substituted or non-substituted polypyrroles, substituted or non-substituted polythiophenes, substituted or non-substituted polyanilines or substituted or non-substituted polyphenylenes. The polypyrroles and in particular the polyanilines are preferred.

The expression polypyrrole used herein means homo- or copolymers of pyrrole and/or substituted pyrrole or copolymers of pyrrole and heteroaromatic compounds having rings of 5 or 6 members.

Preferred pyrroles which can be polymerized according to oxidative polymerization are represented by formula IV.

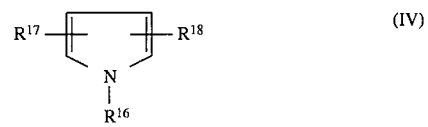

wherein
$R^{16}$ is alkyl, cycloalkyl, aryl, aralkyl, or alkaryl, which groups are optionally substituted by —$COR^{20}$, —$COOR^{20}$, —$SO_2R^{20}$, —$SO_3R^{20}$, —$PO_3R^{20}R^{21}$, —$PO_2R^{20}$, —$NR^{20}R^{21}$, —$OR^{20}$, —$SR^{20}$, —CN or —$SiR^{20}R^{23}R^{24}$.
or $R^{16}$ is hydrogen, —CN, —$SO_2R^{20}$, —$SO_3R^{20}$, —$COR^{20}$, —$PO_2R^{20}$ or —$Si(R^{22})_3$;
$R^{20}$ and $R^{21}$ independently represent hydrogen, alkyl, aryl or aralkyl;
$R^{22}$, $R^{23}$ and $R^{24}$ independently represent alkyl or phenyl;
$R^{17}$ and $R^{18}$ independently represent hydrogen, alkyl, cycloalkyl, aryl, aralkyl, alkaryl, —COR19, —CN or halogen; and
$R^{19}$ is hydrogen, alkyl or aryl.

Among the alkyl radicals, $C_1$–$C_{20}$-alkyl groups are preferred, such as methyl, ethyl, propyl, butyl, cetyl, lauryl or stearyl groups. Methyl is the most preferred alkyl radical.

Among the cycloalkyl radicals, a $C_5$–$C_7$-cycloalkyl is preferred, that is cyclopentyl, cyclohexyl or cycloheptyl, of which cyclohexyl is the most preferred.

Preferred halogen radicals are bromine and chlorine. Aryl radicals preferably represent phenyl or naphthyl, most preferably phenyl.

Aralkyl preferably represents a $C_7$–$C_{14}$-aralkyl, most preferably benzyl.

Substituted groups are preferably mono- or disubstituted, most preferably mono-substituted. Pyrroles which are substituted at the aromatic ring are preferably substituted in the 3- and/or 4-position.

Preferred pyrroles are the unsubstituted pyrrole, the N-alkylpyrroles, in particular the N-methylpyrrole, or the N-arylpyrroles, in particular the N-phenylpyrrole as well as the pyrroles which are substituted at the aromatic ring with one or two alkyl groups, preferably methyl groups or one or two halogen radicals, preferably bromine or chlorine.

The optionally substituted pyrroles can be copolymerized with other heteroaromatic compounds, preferably with furane, thiophene, thiazole, oxazole, thiadiazole, imidazole, pyridine, 3,5-dimethylpyridine, pyrazine, pyridazine, 3,5-dimethylpyrazine, carbazole or phenothiazine.

The most preferred pyrrole copolymers are those produced from unsubstituted pyrrole and optionally substituted N-methylpyrrole and copolymers produced from unsubstituted pyrrole or N-methylpyrrole and furane or thiophene. These pyrrole copolymers contain preferably from about 0.1 to 10 mol percent of the aforementioned other heteroaromatic compounds, based on the amount of pyrrole. The most preferred polypyrrole is a homopolymer of unsubstituted pyrrole.

"Polyaniline" includes homo- or copolymers of aniline and/or substituted aniline or copolymers of aniline and/or substituted aniline with heteroaromatic compounds having five our six members in the aromatic ring. Substituted anilines are preferably substituted in the meta- or ortho-position. Preferred monomers for producing a polyaniline are unsubstituted aniline, methylanilines, such as N-methylaniline, 2-methylaniline or 3-methylaniline, methoxyanilines, such as 3-methoxy- or 2-methoxyaniline, and N-phenyl-1,4-diaminobenzene. Preferred aniline copolymers are produced from substituted or, preferably, unsubstituted aniline and up to 25 percent pyrrole, based on the total polymer weight. Other preferred aniline copolymers contain unsubstituted aniline and up to 50 percent, preferably up to 25 percent, of an above-mentioned substituted aniline, such as 3-methoxy- or 2-methoxyaniline, based on the total polymer weight. A homopolymer of unsubstituted aniline is preferred.

Polythiophene includes homo- or copolymers of thiophene and/or a substituted thiophene or copolymers of thiophene and/or a substituted thiophene with heteroaromatic compounds having 5 or 6 members in the aromatic ring. Preferred thiophene monomers are the unsubstituted thiophene or thiophene which is substituted at the 3-position, such as thiophene-3-sulfonic acid.

The electrically conductive polymer composition, comprising the above-mentioned polymers a) and d) can be produced by polymerizing I) one or more aromatic compounds, i.e. the monomeric precursor(s) of polymer a), which are dissolved or dispersed in an aqueous or organic solvent in the presence of a film or coating of polymer b) described above or II) one or more aromatic compounds in the gas phase in the presence of a film or coating of polymer b) described above or III) one or more aromatic compounds which are dissolved or dispersed in an aqueous solvent in the presence of a polymer b) in the form of fine particles described above or IV) one or more aromatic compounds which are dissolved or dispersed in an aqueous solvent in the presence of an above-mentioned water-soluble polymer c) and a water-soluble oxidizing agent containing a polydentate anionic complex having a redox potential sufficient for enabling oxidative polymerization of said aromatic compound(s) whereby polymer b) is produced in situ in the form of fine particles or V) one or more aromatic compounds which are dissolved or dispersed in an organic solvent in the presence of a polymer b) in the form of fine particles described above.

Method I of preparing an electrical conductive polymer composition of the present invention is described below using poly(diallyldimethylammonium-peroxodisulphate), hereafter poly-DDAP, as polymer b) and unsubstituted pyrrole as the monomeric precursor of polymer a), however the process is also applicable to other polymers b) and other monomeric precursors of polymer a).

According to method I dissolved pyrrole is contacted with poly-DDAP in the form of a coating or a film, which has for example been prepared according to method A), B), C) or D) described above. In method I) pyrrole can be dissolved in water or aqueous methanol in an amount of from 0.1 to 50, preferably of from 1 to 10 weight percent, based on the weight of aqueous methanol. Preferably pyrrole is dissolved in an inert organic solvent such as propylene carbonate, acetonitrile, a halogenated hydrocarbon such as methylene chloride or a hydrocarbon such as pentane, hexane or cyclohexane in an amount of from 0.01 to 50 weight percent, preferably from 0.1 to 50 weight percent, more preferably from 1 to 10 weight percent, based on the weight of the organic solvent. Preferably, the reaction is performed at a temperature of between 5° and 25° C., more preferably below ambient temperature. The reaction is spontaneous and is generally completed within about two hours, depending on the thickness of the poly-DDAP film.

The films or coatings produced from poly-DDAP and pyrrole are obtained in the form of black films or coatings. After having washed the film, for example with methanol and afterwards with water, and after drying, the obtained film-type polymer composition of the present invention is highly scratch resistant and has good adhesion to substrates such as glass, metal, paper or plastics. Accordingly, the electrically conductive polymer composition of the present invention is particularly useful as a coating. It is preferred to use poly-DDAP as a coating on a substrate which has been produced according to method A) described above for producing these types of electrically conductive polymer compositions. Conductivity measurements of polymer compositions prepared from poly-DDAP and pyrrole have shown conductivities between $10^{-6}$ and $10^{-7}$ S/cm. Coatings of poly-DDAP have an electrical conductivity of about $10^{-14}$ S/cm or less when poly-DDAP is dry.

Coatings or films with increased conductivity can be obtained if conducting salts are added to pyrrole or to the above mentioned aqueous or organic solutions. Preferred conducting salts are those which have been previously mentioned above. Inorganic salts in aqueous methanol are preferred. The volume ratio between water and methanol is in general from about 0.1:1 to about 10:1, preferably from about 0.5:1 to about 2:1. If an organic solvent is used for dissolving pyrrole, then organic conducting salts such as alkali and ammonium salts of n-dodecylsulphate, aromatic sulfonic acids, phthalocyanine sulfonic acids, polystyrene sulfonic acids, campher sulfonic acid, styrene sulfonic acid, vinyl sulfonic acid, long chain fatty acids or benzene sulfonic acid are preferably used therewith. These organic conducting salts are soluble in organic solvents such as acetonitrile, methylene chloride or propylene carbonate. The organic solvents or aqueous solvents for the conducting salts such as aqueous methanol may be mixed with the above mentioned solvents for pyrrole. The molar ratio between pyrrole and the conducting salt preferably is from 3:1 to 20:1, more preferably from 3:1 to 10:1. Electrically conductive polymer compositions produced from poly-DDAP and pyrrole having an electrical conductivity between about $10^{-2}$ and $10^{-4}$ S/cm are obtainable when using conducting salts. The process for producing electrically conducting polymer compositions in the presence of conducting salts is particularly suitable for producing self-supporting films. In preparing a self-supporting electrically conductive polymer composition, it is preferred to start from a self- supporting poly-DDAP film produced according to method B) or D) described above, most preferably according to method B) in which an above mentioned slightly cross-linked polymeric starting material c) has been used for preparing the poly-DDAP film.

Instead of polymerizing pyrrole in the presence of polymer b) and a conducting salt, it is also possible to produce polymer b), such as poly-DDAP, in the presence of a conducting salt as described above and then polymerizing pyrrole in the absence of a conducting salt. According to both methods, polymer compositions are obtainable which have an electrical conductivity of up to $10^{-2}$ to $10^{-4}$ S/cm.

It has been found that coatings or, preferably, self-supporting films of the electrically conductive polymer composition of the present invention with even higher electrical conductivities are obtained when a poly-DDAP film is used as an anode which is connected with a cathode such as a platinum electrode. Both electrodes are contacted with an electrolyte which preferably is an above mentioned organic solvent, optionally mixed with water, containing an above mentioned conducting salt and pyrrole. Pyrrole and the conducting salt(s) are generally present in the elctrolyte in molar concentrations of from 0.001 to 5. Generally an initial potential of 1 to 100 volts, preferably of 1 to 50 volts and most preferably of 2 to 25 volts is applied between the anode and the cathode. According to this method polymer films are obtainable which have an electrical conductivity of more than $10^{-2}$ S/cm. These films are useful as an electrode material or in batteries.

In a further method II) of producing the electrically conductive polymer compositions of the present invention, a film or a coating of polymer b) such as poly-DDAP is contacted with evaporated pyrrole or can be sprayed with pyrrole.

According to method III of preparing an electrically conductive polymer composition comprising an electrically conductive polymer a) of one or more aromatic compounds and a polymer d) having ammonium, phosphonium or sulfonium groups in the polymer chain(s), one uses a polymer b) containing a polydentate, anionic complex which has a redox potential sufficient for enabling oxidative polymerization of aromatic compounds, such as a substituted or unsubstituted pyrrole, a substituted or unsubstituted thiophene or a substituted or unsubstituted aniline. Polymer b) is used as a solid oxidizing agent. Polymer b) has ammonium phosphonium or sulfonium groups in the polymer chain(s). Polymer b) is used in the form of fine particles having an average size of 5 nm to 1 mm, generally of 10 nm to 0.1 mm, preferably of 100 nm to 0.1 mm and more preferably of 500 nm to 0.01 mm.

In the following paragraphs method III for preparing an electrically conductive polymer composition of the present invention, comprising the above-mentioned polymers a) and d), in an aqueous reaction diluent in the presence of an above described polymer b) is described in detail.

The aqueous reaction diluent preferably is water. Optionally it contains up to 20 volume percent, preferably only up to 10 volume percent methanol or an other polar organic liquid, based on the total volume of the aqueous reaction diluent.

The useful concentration of polymer b) depends on various factors, such as the molecular weight of polymer b) and the amount of polar organic liquid which is optionally present. If the aqueous reaction diluent contains a polar organic liquid in the above mentioned amounts and the average weight molecular weight $M_n$ of polymer b) is higher than about 50,000, diluted dispersions of polymer b) are preferred.

In any event, the amount of polar organic liquid, the molecular weight $M_n$ of polymer b) and the concentration of polymer b) in the aqueous reaction diluent should be chosen in such a manner that the reduced form of polymer b), i.e. polymer d), is soluble in the aqueous reaction diluent.

Polymer b) is dispersed, preferably under vigorous stirring, for example at 300 rpm (revolutions per minute) or more, more preferably at 400 rpm to 600 rpm in the aqueous reaction diluent at an amount of 0.01 to 50 percent, preferably 0.01 to 40 percent, more preferably of 0.1 to 30 percent and most preferably of 0.2 to 20 percent, based on the weight of the aqueous reaction diluent. The aqueous dispersion of polymer b) produced according to method G described above without isolation of polymer b) can also be used.

The aromatic compound to be polymerized is dissolved or dispersed in the aqueous reaction diluent.

When using heteroaromatic compounds, such as an optionally substituted pyrrole or an optionally substituted thiophene, the oxidative polymerization is preferably carried out in the presence of a conducting salt, for example one of the conducting salts listed above. The aqueous reaction diluent preferably contains the conducting salt in an amount of from 0.001 to 10 mols per liter, more preferably from 0.01 to 1 mol per liter.

When using an optionally substituted aniline, it is advisable to convert it to its protonated form, i.e., to a salt form, prior to oxidative polymerization. Preferably, aniline is reacted in situ in the aqueous reaction diluent with one or more inorganic acids, such as HCl, $H_2SO_4$ or with one or more strong organic acids, such as benzene sulfonic acid, p-toluene sulfonic acid, benzoic acid, $CH_3SO_3H$ or trifluoroacetic acid. Benzenesulfonic acid, $CH_3SO_3H$ and hydrochloric acid are preferred. It is not necessary that the entire amount of the protonated aniline is soluble in the aqueous reaction diluent.

The molar ratio between the aromatic compound to be polymerized and the ammonium, phosphonium or sulfonium groups in the cross-linked polymer b) generally is from about 0.01:1 to about 50:1, preferably from about 0.1:1 to about 50:1, more preferably from about 1:1 to about 15:1 and most preferably from about 1:1 to about 5:1.

The useful reaction temperature mainly depends on the type of aromatic compound to be polymerized. When polymerizing a pyrrole-type aromatic compound, the reaction temperature should generally be below 25° C. in order to avoid secondary reactions, such as cross-linking of the pyrrole-type aromatic compound with polymer b), which decrease the electrical conductivity of the produced polypyrrole; the reaction temperature preferably is 15° C. or lower, more preferably 5° C. or lower. When polymerizing an aniline-type aromatic compound the reaction temperature is less critical since aniline is less reactive. Generally, it is from −20° C. to 100° C., preferably from 0° C. to 50° C. and most preferably from 5° C. to 40° C.

The color of the reaction mixture changes during the polymerization process. During the polymerization the polydentate anionic complexes having the above mentioned redox potential are reduced. The reduced form of polymer b), i.e. polymer d) mentioned above, dissolves in the aqueous reaction diluent.

The dissolved polymer d) which remains in the aqueous reaction diluent can be reacted with polydentate anionic complexes having the above mentioned redox potential, such as $S_2O_8^{2-}$ groups, as has been described above when describing the preparation of polymer b) from polymer c). Aqueous solutions which contain $S_2O_8^{2-}$ groups in an amount of more than 1 weight percent, preferably of more than 10 weight percent, up to saturation are preferably added to the dissolved polymer d). The water-insoluble polymer b) which is produced in such a manner can be reused in further processes for preparing electrically conductive polymers a).

The electroconductive polymer composition is obtained in the form of fine particles having an average size of 5 nm to 1 mm, generally of 10 nm to 0.1 mm, preferably of 100 nm to 0.1 mm, most preferably of 500 nm to 0.01 mm. The polymeric particles can be separated from the aqueous reaction diluent by known means such as conventional filtration, centrifugation or filtration by suction and are preferably purified by washing, for example with water or organic liquids, such as methanol.

The particles of the electrically conductive polymer composition can be pressed to articles of a stable shape, such as pellets, at a temperature from about 50° C. to about 300° C., preferably from about 100° C. to about 250° C., and at a pressure of from about 10 bar to about 400 bar, preferably from about 50 bar to about 250 bar, according to the method disclosed in DE-A-32 27 914. Generally, the highest measured conductivities of such pellets are between $10^{-2}$ S/cm and 5 S/cm.

Analysis of the produced electrically conductive material indicates that the polymer composition not only contains an electrically conductive polymer a) but also a polymer d) having ammonium, phosphonium or sulfonium groups in the polymer chain(s). In some cases the presence of polymer d) in the produced polymer composition may be due to an incomplete solution of polymer d) in the aqueous reaction diluent. Without wanting to be bound to the theory, it is however believed that the particles of the electrically conductive polymer composition produced according to method III described above contain a core, which contains polymer a) in substantially pure form, and a polymer d) which is mainly located at the outside of the particles, i.e. polymer d) is the coating or a partial coating of the particles or acts as a surfactant respectively.

The core/coating structure of the electrically conductive polymer particles, prepared according to method III, has been confirmed by S.E.M. (scanning electron microscope).

In a further method IV, the monomeric precursor(s) of polymer a) is polymerized in the presence of one of the above mentioned known polymers c). In this method, a cross-linked polymer b) having anions such as $S_2O_8^{2-}$ is produced in situ by polymerizing the monomeric precursor(s) of polymer a) in the presence of a water-soluble oxidizing agent which contains polydentate anionic complexes having a redox potential sufficient for enabling oxidative polymerization of the monomeric precursor(s) of polymer a) and in the presence of a polymer c) which contains anions which are spontaneously exchangeable with the polydentate anionic complexes in the water-soluble oxidizing agent. Useful polymers c) and oxidizing agents are described above. The monomeric precursor of polymer a) such as pyrrole, polymer c) such as poly(diallyldimethylammonium chloride) and an oxidizing agent such as $K_2S_2O_8$ are diluted with a diluting agent such as water or aqueous methanol, preferably water. The concentration of polymer c) in the aqueous reaction diluent generally is from 0.01 to 50 percent, preferably from 0.01 to 40 percent, more preferably from 0.1 to 30 percent and most preferably from 0.2 to 20 percent, based on the weight of the aqueous reaction diluent.

The molar ratio between the monomeric precursor(s) of polymer a) and the oxidizing agent preferably is from 6:1 to 50:1, more preferably from 6:1 to 20:1. The ion exchange and the cross-linking of polymer c) and the polymerization of the monomeric precursor(s) of polymer a) preferably is carried out in the presence of a conducting salt as described above. The molar ratio between the monomeric precursor of polymer a) such as pyrrole and the conducting salt preferably is from 3:1 to 20:1, more preferably from 3:1 to 10:1. According to method IV, polymer compositions of the present invention are preferably produced at a temperature between 15° C. and 40° C., more preferably at about ambient temperature. The resulting suspension or solution of the electrically conductive polymer composition of the present invention can be applied to substrates. After drying, the produced coatings are highly scratch resistant and have a very good adhesion to the substrate. Coatings with an electrical conductivity of up to about 10 −3 S/cm are obtainable according to this process.

It has been found that when applying certain reaction conditions in method IV, an electrically conductive polymer composition is produced which comprises i) a core of an electrically conductive polymer a) of one or more aromatic compounds and ii) a coating of a polymer d) having ammonium, phosphonium or sulfonium groups in the polymer chain(s), the weight of the coating being up to about 25 percent, based on the total weight of a) and d) and the polymer composition having an average particle size of 5 nm to 1 mm.

Method IV wherein these reaction conditions are applied is described below as method IVa.

The core/coating structure of the electrically conductive polymer particles prepared according to method IVa is confirmed by S.E.M. (scanning eletron microscope).

In the practice of method IVa, a water-soluble oxidizing agent is continuously or batch-wise added to an aqueous reaction mixture which contains one or more aromatic compounds, a polymer c) and an aqueous reaction diluent described above. The water-soluble oxidizing agent preferably is $A'_2S_2O_8$, $A'ClO_4$, $A'_2Cr_2O_7$, $A'MnO_4$ or $A'_3[Fe(CN)_6]$ wherein A' is a cation, preferably the hydrogen ion, an alkali metal cation, such as lithium, sodium or potassium, an alkaline earth metal ion such as magnesium or calcium or an ammonium ion such as tetramethyl ammonium or $NH_4^+$. The most preferred oxidizing agents are $H_2S_2O_8$, $Na_2S_2O_8$, $K_2S_2O_8$ and $(NH_4)_2S_2O_8$. Useful aqueous reaction diluents for method IVa have been indicated above when describing method III for preparing the electrically conductive polymer composition.

The molar ratio between the ammonium, phosphonium or sulfonium groups in polymer c) and the oxidatively polymerizable aromatic compound preferably is from about 0.001:1 to about 10:1, more preferably from about 0.01:1 to about 1:1 and most preferably from about 0.05:1 to about 0.5:1. Polymer c) should generally be dissolved in the aqueous reaction diluent in a concentration of from about 0.01 to about 5 percent, preferably from about 0.1 to about 2.5 percent, based on the weight of the aqueous reaction diluent. For obtaining electrically conductive polymer compositions having a high electrical conductivity, the molar ratio between polymer c) and the aromatic compound and the concentration of the polymer c) in the aqueous reaction diluent is critical. By varying the said molar ratio and concentration of polymer c) beyond the above-mentioned ranges, as described further below, the particle size and the electrical conductivity of the produced electrically conductive polymer composition can be influenced.

When using heteroaromatic compounds, such as an optionally substituted pyrrole or an optionally substituted thiophene in the oxidative polymerization process, the aqueous reaction mixture preferably contains an above-mentioned conducting salt. The alkali metal salts such as the sodium salt of benzene sulfonic acid or benzene disulfonic acid, $NaHSO_4$ or $CH_3$—$SO_3Na$ are the most preferred conducting salts. The molar ratio between the heteroaromatic compound and the conducting salt preferably is from about 0.1:1 to about 10:1, more preferably from about 1:1 to about 4:1.

For the oxidative polymerization of a pyrrole-type aromatic compound a reaction temperature of generally about 0 to about 50° C., preferably of about 0° to about 20° C., more preferably of about 0° to about 10° C. is useful. For the oxidative polymerization of an aniline-type aromatic compound a reaction temperature of generally about 0° to about 80° C., preferably of about 5° to about 50° C., more preferably of about 15° to about 40° C. is useful.

The oxidative polymerization process according to method IVa is explained in detail below using $K_2S_2O_8$ as a water-soluble oxidizing agent although the process is not limited thereto.

In the practice of the oxidative polymerization according to method IVa a catalytic amount of a polymer b) described above containing $S_2O_8^{2-}$ groups is produced in situ in an aqueous reaction mixture and is precipitated from the aqueous reaction mixture by addition of a small amount of the water-soluble oxidizing agent, such as $K_2S_2O_8$, to the aqueous reaction mixture whereby the $S_2O_8^{2-}$ groups react with polymer c) comprised in the reaction mixture. The produced polymer b) containing $S_2O_8^{2-}$ groups oxidizes the aromatic compounds during their oxidative polymerization whereby the $S_2O_8^{2-}$ groups in the polymer containing ammonium, phosphonium or sulfonium groups are reduced to sulfate groups. The polymer containing ammonium, phosphonium or sulfonium groups and sulfate groups is soluble in the aqueous reaction diluent. Then again a small amount of the water-soluble oxidizing agent, such as $K_2S_2O_8$, is added to the aqueous reaction mixture, polymer b) containing $S_2O_8^{2-}$ groups is precipitated, etc. until the oxidative polymerization is completed. Preferably, aqueous solutions containing from about 0.1 weight percent up to saturated solutions of the water-soluble oxidizing agent are added to the aqueous reaction mixture containing an aromatic compound, polymer c) and optionally a conducting salt. More preferably, the aqueous solution contains from 10 to 70 weight percent of the water-soluble oxidizing agent. By "water-soluble" is meant that 0.1 percent or more, usually 1 percent or more, preferably 10 percent or more oxidizing agent is soluble in water, based on the water weight. The molar ratio between the oxidizing agent, such as a peroxodisulfate salt, and the aromatic compound generally is from about 0.1:1 to about 5:1, more preferably from about 0.5:1 to about 2:1, most preferably about 1:1.

The oxidizing agent may be continuously added to the reaction mixture, preferably over a time period of from about 4 to about 30 hours, more preferably from about 6 to about 15 hours. Electrically conductive polymer powder compositions of surprisingly high conductivities are obtained. Polypyrrole based powder compositions have electrical conductivities of up to 5 S/cm. Polyaniline based powder compositions have electrical conductivities of up to 25 S/cm.

Alternatively, the oxidizing agent may be added batchwise to the reaction mixture. Preferably, the total amount of the oxidizing agent is divided into 5 to 20, more preferably 7 to 15, about equal portions. Preferably, the molar ratio between the added peroxodisulfate ions and the ammonium, sulfonium or phosphonium groups in the polymer chain(s) of polymer c) is not less than about 1:2. It is advisable to stir the reaction mixture for a while after each addition of a portion of the oxidizing agent, preferably from about 15 minutes to about 3 hours, more preferably from about 30 to about 60 minutes. The produced polypyrrole based powder compositions have electrical conductivities of up to 5 S/cm. Surprisingly, it has been found that polyaniline based powder compositions having electrical conductivities of even up to 50 S/cm are obtained according to this batch process.

According to method IVa an electrically conductive polymer composition of a very small particle size, i.e. as low as 10 nm, in same cases even as low as 5 nm, can be obtained when the molar ratio between the ammonium, phosphonium or sulfonium groups in polymer c) and the oxidatively polymerizable aromatic compound, such as an optionally substituted aniline, is at least about 25:1, preferably from about 30:1 to about 100:1, and the concentration of polymer c) in the aqueous reaction diluent is from about 5 to about 20 percent, preferably from about 7 to about 15 percent, based on the weight of the aqueous reaction diluent.

The produced aqueous dispersion of the electrically conductive polymer composition comprising polymers a) and d) described above is stable. Upon evaporation of the aqueous reaction diluent mechanically stable, tough films are obtained. Transparent films having a surface resistivity of about $10^5$ to $10^6$ ohms are obtained when producing polyaniline-type polymer compositions.

When choosing the molar ratio between the ammonium, phosphonium or sulfonium groups in polymer c) and the oxidatively polymerizable aromatic compound of from 5:1 to 10:1 and the concentration of polymer c) in the aqueous reaction diluent is from about 5 to about 20 percent, preferably from about 7 to about 15 percent, based on the weight of the aqueous reaction diluent, abrasion resistant coatings made of the electrically conducting polymer composition are obtained according to method IVa upon evaporation of the aqueous reaction diluent. In the case of polyaniline-type polymer compositions these coatings have found to be nontransparent and having a conductivity of $10^{-2}$ to $10^{-3}$ S/cm.

The electrically conductive polymer composition produced according to method IVa is obtained in the form of particles having an average size of 5 nm to 1 mm, usually of 10 nm to 0.1 mm, preferably of 100 nm to 0.1 mm and more preferably of 1000 nm to 0.01 mm. The particle coating consisting essentially of polymer d) described above which coats at least a portion of the polymer a) -type core provides a good adhesion between the individual particles after the aqueous reaction diluent has been removed. The particles of the electrically conductive polymer composition can be pressed to articles of a stable shape such as pellets as described above with respect to the oxidative polymerization process according to method III.

Generally the electrically conductive polymer composition of the present invention produced in an aqueous reaction diluent according to method III or IVa contains up to about 25 percent, preferably from about 2 to about 20 percent and more preferably from about 5 to about 15 percent of polymer d), based on the total weight of the electrically conductive polymer composition.

In the following paragraphs a fifth method (V) for preparing an electrically conductive polymer composition of the present invention of a polymer a) of one or more aromatic compounds and a polymer d) having ammonium, phosphonium or sulfonium groups in the polymer chain(s) in an organic reaction diluent in the presence of an above described polymer b) is described in detail.

If the organic solvent which is used as a reaction diluent is miscible with water, the organic reaction diluent may contain water in an amount of less than 80 percent, preferably up to 50 percent, based on the total volume of the reaction diluent. Organic reaction diluents which do not contain substantial amounts of water, for example less than 10 weight percent, are also useful. When using poly(diallyldimethylammonium peroxodisulfate) as polymer b), the organic reaction diluent preferably consists of a mixture of an organic solvent and water at a volume ratio of about 1:1. In any event, the amount of water has to be small enough that a substantial amount of the reduced form of polymer b), i.e. the above mentioned polymer d), is insoluble in the organic reaction diluent after the oxidative polymerization process. The suspended fine particles of polymer d) serve as a carrier or matrix for the produced electrically conductive polymer a) whereby an electrically conductive polymer composition is produced. Useful organic solvents are for example alcohols, such as methanol, ethanol or the propanols; glycols, such as propylene glycol, ethylene glycol or glycerine; dioxane, tetrahydrofurane, acetonitrile or propylene carbonate.

Polymer b) is dispersed, preferably under vigorous stirring, for example at 300 rpm or more, more preferably at 400 rpm to 600 rpm, in the organic reaction diluent at an amount of 0.01 to 50 percent, preferably of 0.01 to 40 percent and more preferably of 0.2 to 30 percent, based on the weight of the organic reaction diluent. An ultrasonic bath is also useful for dispersing polymer b) in the organic reaction diluent. The aqueous dispersion of polymer b) produced according to method G described above without isolation of polymer b) can also be used and mixed with a sufficient amount of an organic solvent as indicated above.

The aromatic compound, the molar ratio between the aromatic compound to be polymerized and the cross-linked polymer b) and the useful reaction temperature are the same as described above with respect to the oxidative polymerization in an aqueous reaction diluent according to method III. The oxidative polymerization can be carried out in the presence of an organic conducting salt. Preferred examples are alkali metal, alkaline earth metal and ammonium salts of n-dodecylsulfate, aromatic sulfonic acids, phthalocyanine sulfonic acids, polystyrene sulfonic acids, campher sulfonic acid, styrene sulfonic acid, vinyl sulfonic acid, long chain fatty acids or benzene sulfonic acid which are soluble in the organic reaction diluent. The molar ratio between the aromatic compound(s) and the conducting salt preferably is from about 3:1 to about 20:1, more preferably from about 3:1 to about 10:1.

The electrically conductive polymer compositions of polymer a) and polymer d) is obtained in the form of fine particles having an average size of 10 nm to 1 mm, preferably of 10 nm to 0.1 mm, more preferably of 100 nm to 0.1 mm, most preferably of 500 nm to 0.01 mm. The polymeric particles can be separated from the organic reaction diluent, purified, dried and pressed to articles of a stable shape, such as pellets as described above with respect to the oxidative polymerization process according to method III. Generally, the measured conductivities of such pellets are from $10^{-7}$ S/cm to 5 S/cm.

By oxidative polymerization of the above mentioned aromatic compounds in aqueous or organic reaction diluents according to methods III, IVa and V, electrically conductive, fine polymeric particles having the above mentioned average size are produced. By using polymer b), which is dispersed in the reaction diluent, as an oxidizing agent, electrically conductive particles of substantially uniform size can be obtained. Furthermore, the produced electrically conductive polymeric particles do not tend to agglomeration to a substantial extent as long as they are in the aqueous or organic reaction diluent. Without wanting to be bound to a particular theory, it is believed that polymer b) also acts as a dispersing agent in the oxidative polymerization process. Electrically conductive polymeric particles of various sizes can be produced depending on the chosen process parameters.

The electrically conductive polymer compositions of the present invention are useful for many applications generally known for electrically conductive polypyrrole or polyaniline compositions. The coatings or free-standing films can be used as an electrical conductor or semi-conductor, as an electrode material, in a solar cell, for the antistatic finishing of plastics or paper, as an electromagnetic shielding material, as an electrochemical membrane, in a heating film, for capacitive scanning or in fuel cells.

The use of the electrically conductive polymer composition as an electrode material is described below in greater detail. The electrically conductive polymer compositions of the present invention are preferably used for electroplating processes in which organic compounds are oxidized or reduced. Such organic compounds preferably are monomeric precursors of polymer a). The electrically conductive polymer composition preferably is in the form of a coating on a substrate, but self-supporting films are also useful. The polymer composition is useful as an anode on which a film of an above mentioned polymer a) can be deposited by electrochemical oxidative polymerization of the monomeric precursor(s) of polymer a). When polypyrrole is deposited on an electrically conductive polymer composition of the present invention, generally an initial potential of 1 to 100 volts, preferably of 1 to 50 volts and most preferably of 2 to 25 volts is applied between the anode and the cathode. Known cathodes such as platinum electrodes can be used in conjunction with the aforementioned anodes.

The electrolyte preferably is an organic solvent, optionally mixed with water, in which conducting salts are quite soluble. Preferred examples are chlorinated hydrocarbons such as methylene chloride, propylene carbonate and most preferably acetonitrile. The organic solvents may be mixed with up to 50 weight percent, preferably with up to 25 weight percent water, based on the weight of the solvent mixture. Useful conducting salts are the same as those mentioned above. The monomeric precursor(s) of polymer a), such as pyrrole, and the conducting salts are generally present in the electrolyte in a molar concentration of from 0.001 to 5. High electrically conductive polymer films having a coating of polymer a) are obtained according to the above described process. These films are useful as electrode materials or in batteries.

The electrically conductive polymer compositions of the present invention which have been prepared in the form of granules or a powder can be used as an electrically conductive filler for a polymer. The electroconductive filler can be dispersed in an aqueous or preferably in an organic solution of a polymer, such as a polycarbonate or a chlorinated polyethylene. Any polymer is useful which is suitable to form mechanically stable films. The organic solution preferably contains from 0.1 to 25 percent, more preferably from 1 to 20 percent of the said polymer, based on the weight of the solution. The electroconductive filler can be used in amounts of 0.1 to 99 percent, preferably of 10 to 40 percent, by weight of the polymer. Preferred organic solvents are polar organic solvents, such as chlorinated solvents, dimethylformamide or tetrahydrofurane. From the produced dispersions films can be prepared by evaporating the solvent. According to a preferred method the dispersion is applied on a substrate, such as a glass plate before evaporizing the solvent.

The above mentioned electroconductive filler can also be blended with thermoplastic polymers by conventional polymer processing methods, such as using roll-mills or extrusion techniques and the blend can be processed to films by known means.

The electrically conductive polymer compositions which have been prepared according to methods III, IV and V in the form of granules or a powder can also be used for preparing films or coatings. The electrically conductive polymer composition of the present invention is dispersed in an aqueous or organic medium. Alternatively, the produced aqueous or organic dispersions containing the electrically conductive polymer composition of the present invention can be directly used without separating the dispersed electroconductive particles from the aqueous or organic reaction diluent.

In order to obtain films or coating of sufficient mechanical stability, the aqueous or organic dispersion containing the produced electroconductive particles should also contain a binder for these electroconductive particles.

In aqueous dispersions, the dissolved polymer d) which originates from the oxidative polymerization process such as poly(diallyldimethylammonium sulfate) can act as a binder. This is very advantageous because the produced aqueous dispersion containing the electrically conductive polymer composition in the form of dispersed fine particles after the oxidative polymerization can be directly used for coating surfaces by simple evaporation of the aqueous reaction diluent. Other useful binders are water-soluble polymers such as cellulose ethers, for example methylcellulose ethers, hydroxypropylmethylcellulose ethers or carboxymethylcellulose ethers; polyvinylalcohols, poly(vinylalcohol/vinylacetate) and the above mentioned water-soluble polymers c) and polymers d), such as poly(diallyldimethylammonium) chloride. These polymeric binders can be added to the aqueous reaction diluent prior to, during or after the oxidative polymerization of the aromatic compounds according to the process of the present invention. Alternatively, as mentioned above, the electrically conductive polymer composition of the present invention can be separated from the reaction diluent, the wet or dry powder can be redispersed in an aqueous liquid and an above mentioned binder can be added. The aqueous dispersion preferably contains the polymeric binder at an amount of less than 0 percent, more preferably of 0.1 to 5 percent, based on the total weight of the dispersion. The aqueous dispersion is then applied to a substrate, such as wood, paper, glass or a polymeric substrate. After evaporation of the aqueous liquid, conductive or antistatic coatings of various thicknesses and of good abrasion resistance can be obtained.

Analogously, in organic suspensions thermoplastic organic-soluble polymers are useful as binders.

The electrically conductive polymer compositions produced according to processes III and IVa described above wherein polymer a) is an optionally substituted aniline homo- or copolymer may be deprotonated, for example using an aqueous ammonia solution. These deprotonated polymer compositions are soluble in organic solvents such as N-methylpyrrolidone, dimethyl acetamide or dimethyl formamide. Electrically conductive films can be produced from such an organic solution by casting the solution on a substrate such as a glass plate, evaporizing the organic solvent and treating the film with an acid such as hydrochloric acid.

The present invention is further illustrated by the following examples which should not be construed to limit the invention. All percentages and parts are by weight unless otherwise mentioned. Unless otherwise mentioned, the electrical conductivity is determined by measuring the electrical resistivity of powder samples which have been compressed at 10 tons to pellets of a diameter of 13 mm and a thickness of 0.1 mm to 0.4 mm. The volume resistivity of the pellets and the surface resistivity of the coatings and films are measured using a Fluke 8060A RMS multimeter (the distance between the electrodes is one centimeter and the electric potential is 1.18 volt). The values of the volume resistivity have been found to be dependent on the pressure during the measurements. The pellets are compressed at 10 kN during the measurements. Four point-measurements have been carried out according to the "van der Pauw" method. The electrical conductivity is determined as described by H. J. Mair, S. Roth, "Eletrisch leitende Kunststoffe", Carl Hauser Verlag München, Wien, 1986, pages 27–47 and literature cited therein.

EXAMPLE 1

54.5 g of a 19 percent aqueous solution of poly(diallyldimethylammonium chloride), hereafter "poly-DAD-MAC", (0.065 mole), is diluted with water to a total volume of 250 ml. The poly-DADMAC has a monomer content of 12 percent, a polymer content of 88 percent and an intrinsic viscosity of 1.71 dl/g.

The solution is slowly added within 2 hours to a solution of 5.81 g (0.025 mole) of $(NH_4)_2S_2O_8$ in 125 ml of water at 10° C. The solution is vigorously stirred at 500 rpm (revolutions per minute) in order to obtain poly(diallyldimethylammoniumperoxodisulfate), hereafter "poly-DDAP", in the form of an aqueous dispersion (average particle size of poly-DDAP as determined by S.E.M.: 0.015 to 0.020 mm).

The residual content of peroxodisulfate dissolved in the aqueous solution is 0.06 g/l, determined by thiosulfate titration. Thus 98.8 percent of the peroxodisulfate has been precipitated from the aqueous solution.

30 g of aniline (0.32 mole) is brought into a glass reactor and converted into the hydrochloride form by slowly adding 35 g of 37 percent aqueous hydrochloric acid diluted with water to a total volume of 125 ml. The reactor is purged with nitrogen and heated to 30° C. The aqueous suspension of poly-DDAP prepared as described above drops into the reactor within 1 hour. After 1–2 minutes the reaction mixture becomes dark green. The mixture is stirred for 4 hours at 30° C. after complete addition of the aqueous suspension of poly-DDAP. The product is filtered by suction, thoroughly washed with water and with little methanol. The product is dried in vacuum at 40° C. for 12 hours. 2.2 g of a dark green powder is obtained, the yield is 68 percent, based on the amount of the peroxodisulfate salt and based on the molecular weight of aniline hydrochloride.

A portion of the powder is pressed to a pellet. The volume resistivity of a 0.3 cm thick pellet is 18 ohms. The surface resistivity of the dark blue metallic glittering pellet is 50 ohms to 80 ohms (two-point measurement).

Analysis data: 58.05 percent C, 5.48 percent H, 5.96 percent Cl, 11.3 percent N.

EXAMPLE 2

50 g of the poly-DADMAC solution described in Example 1 is diluted with water to 500 ml. The solution is dropped into a solution of 45 g $(NH_4)_2S_2O_8$ in 500 ml of water. The white precipitate of poly-DDAP is filtered by suction and washed with water (average size of the poly -DDAP particles as determined by S.E.M. : 0.015 to 0.025 mm). The poly-DDAP powder is redispersed in 200 ml of water by stirring the suspension for 2 hours.

Aniline hydrochloride is prepared in the same manner as described in Example 1. The aqueous poly-DDAP suspension is added to the solution of aniline hydrochloride and stirred for 18 hours at 30° C. The obtained dark green particles are filtered by suction, washed with water and little methanol. The product is dried in vacuum at 40° C. for 10 hours. 2.14 g of a dark green powder is obtained.

The electrical conductivity is determined to be 3.48 S/cm (four point measurement). The particles adhere well to each other in the pellets. S.E.M. pictures show that the particles having a size of 1000 to 2000 nm are bound together in larger agglomerates which have a size of about 0.01 mm and are provided with a coating.

EXAMPLE 3

50 g of the poly-DADMAC solution described in Example 1 is diluted with water to a total volume of 500 ml (0.05 mole, 1.9 percent poly-DADMAC, based on the weight of the solution). This solution is dropped within 2 hours under vigorous stirring into a solution of 45 g of $(NH_4)_2S_2O_8$ (0.2 mole) in 500 ml of water at a temperature of 10° C. The white precipitate of poly-DDAP is sucked off and washed with water (average size of the poly - DDAP particles as determined by S.E.M. : 0.015 to 0.025 mm). The precipitate is redispersed in 150 ml of water by vigorously stirring the suspension for 2 hours.

35 g of conc. $H_2SO_4$ are cautiously added to 100 ml of water and the reactor is purged with nitrogen. 30 g of aniline (0.32 mole) is added drop by drop to the acidic solution. Aniline sulfate precipitates from the solution and is dispersed in water by stirring the reaction mixture. The reactor is heated to 30° C. and the aqueous suspension of poly-DDAP is added drop by drop within 25 minutes. After about 2 minutes the reaction mixture becomes dark green. The mixture is stirred for 15 hours at 30° C. Then the dark green particles are filtered by suction, washed thoroughly with water and with methanol. The product is dried in vacuum for 12 hours at 40° C. 6.2 g of a dark green powder is obtained. The electrical conductivity is determined to be 1.94 S/cm (four-point measurement).

EXAMPLE 4

Preparation of an aqueous suspension of poly-DDAP 50.0 g of a 21.4 percent aqueous solution of poly-DADMAC is diluted with water to a total volume of 250 ml. The poly-DADMAC has a monomer content of 7 percent, a polymer content of 93 percent and an intrinsic viscosity of 1.90 dl/g. The solution is added under vigorous stirring to 6.27 g of $(NH_4)_2S_2O_8$ dissolved in 125 ml of water at 5° C. within 1 hour. The aqueous suspension of the produced poly-DDAP is used for the further conversion with aniline.

Preparation of the electrically conductive polyaniline based powder composition 54 g of benzene sulfonic acid is dissolved in 500 ml of water in a glass reactor and purged with nitrogen. 30 g of aniline is added drop by drop to the solution and the reactor is heated to 30° C. The aqueous suspension of poly-DDAP is added within 1 hour. The reaction mixture becomes dark green and stirring is continued for 15 hours at 30° C. Then the polyaniline based powder composition is filtered by suction and washed with water and methanol. The powder is dried in vacuum for 12 hours at 40° C. The yield is 3 g.

A portion of the powder is pressed to a pellet. The volume resistivity of a 0.35 cm thick pellet is 40 ohms (two-point measurement).

EXAMPLE 5

50 g the poly-DADMAC solution described in Example 4 is diluted with water to a total volume of 500 ml. The solution is slowly dropped into a solution of 63 g of $(NH_4)_2S_2O_8$ in 500 ml of water. The white poly-DDAP precipitate is filtered by suction and washed with water. The poly-DDAP is dispersed in a mixture of 250 ml of methanol/water (volume ratio 1:1) by vigorously stirring the suspension for 2 hours.

35 g of 37 percent aqueous hydrochloric acid is diluted with water to 125 ml in a glass reactor and 125 ml methanol is additionally put into the reactor. Then 30 g of aniline is slowly added and the reactor is heated to 30° C. The aqueous suspension of poly-DDAP is added drop by drop within 1 hour. Stirring of the reaction mixture is continued after complete addition of poly-DDAP for 4 hours. The black particles are filtered by suction and washed with water and methanol. After vacuum drying at 35° C. for 8 hours 5.9 g of a black powder is obtained.

A portion of the material is pressed into a pellet of 0.35 cm thickness. The volume resistivity is 7 ohms (two-point measurement).

EXAMPLE 6

An aqueous suspension of poly-DDAP is prepared as described in Example 2.

50 g $NaBF_4$ is dissolved in 100 ml of water in a glass reactor which has been purged with nitrogen. 15 g of pyrrole is added to the solution. The solution is stirred and heated to 30° C. The aqueous suspension of poly-DDAP is added within 1 hour. As soon as the first drops of the suspension have been added, the reaction mixture becomes dark. Stirring of the mixture is continued for 15 hours at 30° C. Then the black reaction produced is filtered by suction, washed with water and methanol and dried in vacuum at 35° C. for 8 hours. 13.7 g of a black powder is obtained.

A portion of the material is pressed into a pellet of 0.4 cm thickness. Its volume resistivity is $9.10^4$ ohms.

EXAMPLE 7

Example 7 is carried out as described in Example 6, but the reaction temperature is kept between 5° C. and 10° C. for 6 hours. The product is isolated, washed and dried as described in Example 6.

The volume resistivity of a pellet of 0.2 cm thickness is $9.10^1$ ohms.

EXAMPLE 8

53.3 g of the poly-DADMAC solution described in Example 4 is diluted with water to 500 ml and dropped into a solution of 66 g of $(NH_4)_2S_2O_8$ in 125 ml of water. The white microflocs of poly-DDAP are filtered, washed with water and again dispersed by stirring them in 150 ml of water.

This suspension is dropped into a solution of 54 g benzenesulfonic acid and 20 g pyrrole in a mixture of 450 ml of water and 50 ml of methanol at 5° C. The black reaction mixture is stirred for 5 hours at this temperature. Then the temperature is allowed to raise to 20° C. and stirring of the mixture is continued for 10 hours. The dark green to black product of very fine particle size is allowed to settle overnight, the water is then decanted and the particles are isolated by filtration. The product is washed with methanol and dried at 35° C. in vacuum. The yield of the product is 7.1 g.

The electrical conductivity is determined to be 3.4 S/cm (four-point measurement).

EXAMPLE 9

A suspension of poly-DDAP is prepared as described in Example 2. The white particles are filtered by suction and washed with water. The product is dispersed in 225 ml of a mixture of methanol and water at a volume ratio of 2:1 by vigorous stirring.

225 ml of a mixture of methanol and water at a volume ratio of 2:1 and 25 g pyrrole are brought into the glass reactor. The suspension of poly-DDAP in the methanol/ water mixture is slowly dropped under stirring into the mixture of pyrrole and the methanol/water mixture. The reaction temperature is kept at 35° C. for 5 hours. The black product is filtered and thoroughly washed with methanol. After drying in vacuum at 35° C. a portion of the product is pressed into a pellet of 0.15 cm thickness.

Its volume resistivity is $2.10^6$ ohms. The yield is 9.3 g.

EXAMPLE 10

A dispersion of poly-DDAP in 225 ml of a methanol/water mixture, prepared as described in Example 9 is added drop by drop to a solution of 24.6 g of $NaBF_4$ in a mixture of 150 ml of methanol, 75 ml of water and 23 g of pyrrole. The reaction mixture is then stirred for 6 hours. Then the blue-black product is filtered by suction, washed with water and methanol and dried in vacuum as described in Example 9. The yield of the powdery product is 8.5 g.

A 0.2 cm thick pellet of the pressed powder has a volume resistivity of $4.10^3$ ohms.

Use of a polymer composition of polyaniline (polymer b)) and poly(dimethyldiallylammonium sulfate) (polymer d)) in powder form as electroconductive filler in a polymer (Examples 11–14)

EXAMPLE 11

2.5 g of polycarbonate (sold by Aldrich) is dissolved in 25 ml of methylene chloride. 1 g of a pulverized polyaniline based polymer composition, prepared according to Example 1, is dispersed in the solution under stirring for 20 hours. A portion of the dispersion is then poured on a glass plate and the solvent is allowed to evaporate. A flexible black polycarbonate film of 2 mm thickness is obtained.

The backside of the film which has adhered to the substrate has an electrical resistivity of $1.10^3$ ohms to $4.10^3$ ohms. The resistivity of the front surface of the film is about $4.10^4$ ohms.

EXAMPLE 12

2.5 g of polycarbonate is dissolved in 25 ml of methylene chloride and 0.25 g of a pulverized polyaniline based polymer composition, prepared according to Example 1, is dispersed in the solution. A conductive antistatic dark-green to black film of 0.2 mm thickness is prepared as described in Example 11.

The backside of the film which has adhered to the substrate has an electrical resistivity of $10^4$ ohms to $10^5$ ohms; the front surface of the film has an electrical resistivity of $10^6$ ohms.

EXAMPLE 13

1 g of a polymer composition which has been prepared as described in Example 5 is dispersed in a solution of 2.5 g of polycarbonate in 25 ml of methylene chloride for 20 hours. A conductive film is prepared as described in Example 11.

The backside of the film which has adhered to the substrate has an electrical resistivity of $2.10^4$ ohms to $5.10^4$ ohms, the front surface of the film has an electrical resistivity of $1.10^6$ ohms to $2.10^6$ ohms.

EXAMPLE 14

52 g of the 21.4 percent poly-DADMAC solution described in Example 4 is diluted with water to a total volume of 250 ml. This solution is slowly added to a solution of 65.2 g of $(NH_4)_2S_2O_8$ in 250 ml of water at 5° C. to 10° C. under vigorous stirring. After stirring for an additional hour, the white precipitate is filtered and washed with water. The solid poly-DDAP particles are dispersed in methanol and filtered again. This procedure is repeated with methylene chloride.

30 g of polycarbonate (sold by Aldrich) is dissolved in 300 ml of methylene chloride. 200 ml of the solution is placed in a glass reactor and 9 g of aniline hydrochloride prepared according to Example 1 is added which does not completely dissolve in the solution. The solid, washed poly-DDAP particles are dispersed in 100 ml of the polycarbonate solution in methylene chloride by vigorous stirring for 2 hours. Some poly-DDAP is still dispersed in the polymer solution in the shape of larger flocs. The dispersion is placed into a glass reactor within 1 hour while stirring. The reaction mixture becomes blue after about 10 to 15 minutes and later black. The reaction mixture is stirred overnight at room temperature. The dispersion is poured on a glass substrate and the reaction diluent is allowed to evaporate.

The backside of the produced film which has adhered to the glass plate has an electrical resistivity of $2.10^3$ ohms.

EXAMPLE 15

53.3 g of the 21.4 percent poly-DADMAC solution described in Example 4 is diluted with water to a total volume of 250 ml. This solution is dropped under vigorous stirring into a solution of 16.7 g of $(NH_4)_2S_2O_8$ in 250 ml of water at 5° C. to 10° C. The white precipitate of poly-DDAP is filtered and washed with water. 68.2 g of wet product is obtained.

6.7 g of aniline hydrochloride prepared according to Example 1 is dissolved in 50 ml of water. The wet solid poly-DDAP is added within 4 hours in about four parts to the aniline hydrochloride solution at 18° C. After the first part has been added, the reaction mixture becomes blue, then dark-blue and turns to green-black after about 20 minutes. The reaction mixture is stirred for 5 hours and becomes highly viscous due to the simultaneous formation and dissolution of poly(diallyldimethylammonium sulfate) in water. The reaction mixture is diluted with 50 ml of water and stirring of the solution is continued for 15 hours at 20° C. The viscous aqueous dispersion containing the dispersed polyaniline based polymer composition of very fine particle size is poured on a glass plate. The water is allowed to evaporate. The dark green to black coating is highly abrasive resistant.

Its electrical resistivity is $1.10^3$ ohms.

EXAMPLE 16

54 g of the 21.4 percent poly-DADMAC solution described in Example 4 is diluted with water to a total volume of 500 ml. The solution is slowly added to a solution of 6.8 g of $(NH_4)_2S_2O_8$ in 500 ml of water at 5° C. to 10° C. to produce an aqueous dispersion of poly-DDAP.

2.2 g of aniline hydrochloride prepared according to Example 1 is added to 250 ml of the prepared aqueous dispersion of poly-DDAP at 30° C. The solution turns dark green after a couple of minutes. The reaction mixture is stirred for 15 hours at 30° C. The amount of the produced polyaniline based polymer composition is about 0.2 percent, based on the weight of the aqueous reaction diluent. The aqueous dispersion is poured on a glass substrate and the water is allowed to evaporate.

The electrical resistivity of the coating is $7.10^4$ ohms.

EXAMPLE 17

200 ml of the aqueous poly-DDAP dispersion prepared according to Example 15 is added to 50 ml of an aqueous 2 percent solution of a hydroxypropylmethylcellulose ether. 1.75 g of aniline hydrochloride prepared according to Example 1 is added and the solution is stirred for 15 hours at 30° C. Then the solution is poured on a glass substrate and the water is allowed to evaporate at 40° C.

The electrical resistivity of the obtained dark green film is $8.10^5$ ohms.

EXAMPLE 18

100 g of a 9.5 weight percent aqueous poly-DADMAC-solution (0.06 mole DADMAC, intrinsic viscosity 2.95 dl/g) is acidified by adding 3 drops of concentrated hydrochloric acid. 90 mg (0.7 mmole) of aniline hydrochloride is dissolved in this solution. A solution of 160 mg of $(NH_4)_2S_2O_8$ (0.7 mmole) dissolved in 10 ml of water is added drop by drop (the molar ratio between the ammonium groups in poly-DADMAC and the peroxodisulfate ions or the aniline hydrochloride is 83.7). The solution is stirred overnight and becomes dark green. The produced polyaniline based polymer composition is obtained as a microsuspension having a particle size of about 5 nm. The particles remain dispersed in the reaction diluent, (i.e. do not settle on the bottom of the reactor). A portion of the solution is brought on a 7×7 cm glass plate and the water is allowed to evaporate. A dark green light-transmissive coating is obtained which can be peeled off in the form of a flexible, mechanically stable film having a surface resistivity of $10^5$ ohms.

EXAMPLE 19

Example 18 is repeated, however 90 mg of aniline hydrochloride and 50 mg of pyrrole are added to 100 g of the 9.5 weight percent poly-DADMAC solution mentioned in Example 18. A solution of 180 mg of $(NH_4)_2S_2O_8$ dissolved in 10 ml of water is added. Upon evaporation of water a light-transmissive blue to black film is obtained.

EXAMPLE 20

15 g of a 9.5 weight percent aqueous solution of poly-DADMAC (intrinsic viscosity 2.95 dl/g) are diluted with 100 ml of water and 50 ml of hydrochloric acid. 19.3 g of aniline hydrochloride (0.15 mole) and 1.4 g of pyrrole (0.02 mole) are dissolved in the solution. 36.5 g of $(NH_4)_2S_2O_8$ are dissolved in 60 ml of water. The aqueous solution of peroxodisulfate is slowly but continuously added to the reaction mixture drop by drop over a period of 6 hours at 5° C. A white precipitate of poly-DDAP can be observed at the beginning of the procedure. The solution is stirred for 4 hours after addition of the aqueous solution of $(NH_4)_2S_2O_8$. Then the product is sucked off, washed with 1 m HCl little methanol and dried in vacuum at 50° C. The yield is 14.3 g. The volume resistivity of a 0.23 cm thick pellet is determined to be 8 ohms (two-point measurement). The product can be dissolved in N-methylpyrrolidone after deprotonation with an aqueous ammonia solution. After evaporation of the solvent, mechanically stable films are obtained.

EXAMPLE 21

15 g of a 9.5 weight percent aqueous solution of poly-DADMAC (intrinsic viscosity 2.95 dl/g) are diluted with 150 ml of water and 20 g of concentrated hydrochloric acid. A mixture of 10 g of aniline and 1 g of m-anisidine is slowly added and converted into the hydrochloride form. 36.5 g of $(NH_4)_2S_2O_8$ dissolved in 50 ml of water are added to the solution in portions of 10 ml each. In between, the solution is stirred for half an hour. After the last addition, the solution is stirred for 2 hours. The product is sucked off, washed with 1 m HCl and little methanol. The product is dried under vacuum at 50° C. The yield is 13.1 g. The volume resistivity of a 0.33 cm thick sample is determined to be 12 ohms (two-point measurement). The powder can be dissolved in N-methyl pyrrolidone after deprotonation with an aqueous ammonia solution. A mechanically stable film can be casted from the solution.

EXAMPLE 22

20 g of a 9.5 weight percent aqueous solution of poly-DADMAC (intrinsic viscosity 2.95 dl/g) is diluted with 150 ml of water, acidified with 3 drops of concentrated hydrochloric acid and brought into a reactor. 13.7 g of pyrrole which has been freshly purified over neutral $Al_2O_3$ is added and the solution is stirred. Then a solution of 22 g of benzene-1.3-disulphonic acid sodium salt in 50 ml of water is added. The initial white precipitate dissolves upon stirring. 45.6 g of $(NH_4)_2S_2O_8$ dissolved in 100 ml water of is slowly but continuously added drop by drop over a period of 8 hours. The temperature is carefully kept between 5° and 10° C. The reaction mixture is stirred over night. The black precipitate is filtered by suction and washed with water and methanol. The powder is dried at 40° C. for 10 hours under vacuum. The yield is 18.5 g. The electrical conductivity is determined to be 0.43 S/cm four-point measurement).

EXAMPLE 23

Example 22 is repeated. A small portion of the reaction solution is brought on a 7×7 cm glass plate. The water is allowed to evaporate. A black abrasive resistant coating is obtained having an electrical conductivity of $1.10^{-3}$ S/cm.

EXAMPLE 24

10 g of a 9.5 weight percent aqueous poly-DADMAC solution (0.015 mole DADMAC, intrinsic viscosity 2.95 dl/g) is diluted with 200 ml of water, acidified with 3 drops of concentrated hydrochloric acid and brought into a reactor. 50 g (0.4 mole) of aniline hydrochloride are dissolved in 50 ml of water and added to the reactor. The molar ratio between the ammonium groups in poly-DADMAC and the aniline hydrochloride is 0.015: 1.45.6 g (0.2 mole) of $(NH_4)_2S_2O_8$ are dissolved in 100 ml of water and added slowly but continuously within 8 hours to the solution. The reaction mixture is stirred for 2 hours. The precipitated electrically conductive polymer composition is sucked off and washed with 1 m aqueous hydrochloric acid. The product is dried under vacuum at 60° C. for 8 hours. The yield is 18.9 g (73 percent related to peroxodisulfate and based on the molecular weight of aniline hydrochloride). The electrical conductivity is determined to be 14 S/cm (four-point measurement).

S.E.M. pictures of the powdery electrically conductive polymer composition show that the particles have a size of 800 to 1000 nm and that these particles are bound together in larger aggregates.

EXAMPLE 25

Example 24 is repeated but a molar ratio between the ammonium groups in poly-DADMAC and aniline hydrochloride of 0.1:1 is selected. The electrical conductivity of the precipitated polymer composition which has been washed and dried as described in Example 24 is determined to be 28.0 S/cm (four-point measurement).

EXAMPLE 26

66.6 g of a 9.5 weight percent aqueous poly-DADMAC solution (0.042 mole DADMAC, having an intrinsic viscosity of 2.95 dl/g) is diluted with 150 ml of water and brought into a glass reactor. A solution of 25.9 g of aniline hydrochloride (0.2 mole) dissolved in 50 ml of water is added. The molar ratio between the ammonium groups in poly-DADMAC and aniline hydrochloride is 0.2:1.45.6 g of $(NH_4)_2S_2O_8$ (0.2 mole) are dissolved in 100 ml of water. 10 ml of this solution (0.02 mole peroxodisulfate) is added to the reaction mixture at once under vigorous stirring. The white precipitate (poly-DDAP) becomes dark-green within one minute. Stirring is continued for one hour. Additional 10 ml of the peroxodisulfate solution are added to the reactor. The reaction mixture is stirred for another hour until the next 10 ml portion of $NH_4S_2O_8$ is added. This procedure is exactly repeated until the perodisulfate solution is completely consumed. After the last peroxodisulfate addition, the solution is stirred for another 2 hours. The total reaction time is about 22 hours.

The fine precipitate is sucked off. The filtered product is washed with little methanol and dried over night under vacuum at 60° C. The yield is 25.9 g (100 mole percent, based on the amount of peroxodisulfate and aniline hydrochloride). The electrical conductivity is determined to be 46.7 S/cm (four-point measurement). S.E.M. photographs of the powder show the core/coating structure of the polymer particles. Particles of about 1000 nm size are agglomerated (bridged) to segmented rods which are about 0.01 mm long. Due to the polymeric coating there is a good contact between the particles.

The powder is deprotonated in an aqueous ammonia solution and dispersed in N-methyl pyrrolidone. Upon evaporation of the solvent, a mechanically stable film is obtained which can be treated with 1 m hydrochloric acid.

EXAMPLE 27

66 g of a 9.5 weight percent aqueous poly-DADMAC solution (0.041 mole, intrinsic viscosity of 2.95 dl/g) are diluted with 150 ml of water and brought into a glass reactor. 60 g of a 70 weight percent aqueous solution of methane sulphonic acid is added. Then 21 g of aniline is slowly added to the reaction mixture upon stirring the solution. 45.6 g of $(NH_4)_2S_2O_8$ (0.2 mole) are dissolved in 100 ml of water. 10 ml of the solution (0.02 mole) are added to the reactor at once. The solution is then stirred for 30 minutes. This procedure is repeated until the total amount of the aqueous peroxodisulfate solution is consumed. The reaction mixture is stirred overnight. The dark blue-green product is filtered, washed with water and methanol, and dried under vacuum at 50° C. for 15 hours. The electrical conductivity is determined to be 21.4 S/cm (four-point measurement).

EXAMPLE 28

1.8 g of a 13.5 percent aqueous solution of poly-(diallyldimethylammonium chloride), hereafter designated as poly-DADMAC is evenly applied to a substrate made of glass having a surface of 7.5 cm×2.5 cm. The poly-DADMAC contains 13 weight percent monomer and 87 weight percent polymer. The average molecular weight of poly-DADMAC is 1,470,000 g/mol, the intrinsic viscosity is 2.16 dl/g. The coated substrate is put in 100 ml of an aqueous solution saturated with $K_2S_2O_8$. The poly-DADMAC solution is quickly solidified to a white film. The film is left for two hours in the $K_2S_2O_8$ solution, removed therefrom and then washed with water and methanol.

The produced film of poly(diallyldimethylammoniumperoxodisulphate), hereafter designated as poly-DDAP, which is fixed on the glass substrate is put in a 5 percent solution of pyrrole in cyclohexane. Polypyrrole is immediately produced resulting in the film turns black. After three hours the film is removed from the pyrrole/cyclohexane bath together with the glass substrate. Any remaining pyrrole which adheres to the film is carefully washed off in methanol. The film is dried at reduced pressure at room temperature. The dried film adheres excellently to the glass substrate and is highly scratch resistant. The specific electrical surface resistivity of the film is $5.7 \times 10^6$ ohms.

EXAMPLE 29

A film of poly-DDAP on a glass substrate produced according to Example 28 is fixed in a glass container near the top which container has been purged with nitrogen. The glass container contains liquid pyrrole which is not in direct contact with the film. A few minutes after the container has been closed, the reaction between the film and the pyrrole gas phase occurs and the polymer film turns black. After two hours the film is removed from the container together with the glass substrate and any non-converted pyrrole is removed from the film with methanol and the film is dried. The specific electrical surface resistivity of the film is $5 \times 10^6$ ohms.

EXAMPLE 30

A poly-DDAP film on a glass substrate is prepared as described in Example 28 and fixed in a glass container comprising liquid aniline as described in Example 29. The film and the glass substrate are left for about 20 hours in the closed container, then removed from the container and the film is then washed with methanol. The specific electrical surface resistivity of the film is $3 \times 10^6$ ohms.

EXAMPLE 31

3.2 g of the poly-DADMAC solution of Example 28 is applied to a glass substrate and put into a bath containing 35 g of $Na_2S_2O_8$ salt in 120 ml of water whereby a solid white film is produced on the substrate. After 2 hours the film and the substrate are removed from the bath and the film is washed with water. The poly-DDAP film which has been obtained on the substrate is then put into a bath of 50 ml methanol and 100 ml water containing 13.6 g dissolved $KHSO_4$ and 12 ml dissolved pyrrole. After 5 hours the film is removed from the bath together with the glass substrate. The film adheres only partially to the substrate. Any salt adhering to the film is removed with water and the film is then washed with methanol.

The specific electrical surface resistivity of the film is $5\times10^3$ ohms (the distance between the electrodes is 1 cm, the potential is 1.15 volts). The self-supporting, wet flexible film obtained is resistant to water and organic solvents.

EXAMPLE 32

Example 31 is repeated, however, $NaBF_4$ is used as a conducting salt instead of $KHSO_4$. The specific electrical surface resistivity of the film obtained is $4\times10^3$ ohms.

EXAMPLE 33

Example 31 is repeated, however, $KPF_6$ is used as the conducting salt instead of $KHSO_4$. The specific electrical surface resistivity of the film obtained is $1\times10^4$ ohms.

EXAMPLE 34

A poly-DDAP film on a glass substrate is produced as in Example 31, however a 10 percent aqueous solution of a monomer-free poly-DADMAC is used as a starting material rather than the poly-DADMAC solution used in Example 28. The produced poly-DDAP film on the substrate is placed into a 5 percent aqueous solution of the sodium salt of polystyrene sulphonic acid to which 8 vol. percent of pyrrole, based on the volume of water, has been added. The film is left in this bath for five hours and removed from the glass substrate. The specific electrical surface resistivity of the film obtained is $1.6\times10^3$ ohms.

EXAMPLE 35

A poly-DDAP film on a glass substrate is produced as described in Example 34 and is placed into a solution of 12 g of $NaBF_4$ in 50 ml of methanol and 100 ml of water which has been mixed with 10 ml of aniline. The film is left for about 20 hours in the bath and then removed from the glass substrate. The specific electrical surface resistivity of the film obtained is $2.5\times10^3$ ohms.

EXAMPLE 36

A poly-DDAP film on a glass substrate is produced as in Example 34 and is placed into a solution of 10 g of tetrabutylammonium hydrogensulphate in 100 ml of acetonitrile to which 12 ml of pyrrole has been added. After five hours the film, which adheres strongly to the substrate, is removed from the solution and then washed with water and then with methanol. The specific electrical surface resistivity of the film obtained is $4\times10^3$ ohms.

EXAMPLE 37

80 parts of a 13.5 weight percent aqueous poly-DADMAC solution as described in Example 28 is diluted with 20 parts of water and mixed with 6.7 parts of pyrrole. The mixture is stirred for half an hour. 4.1 parts of $NaHSO_4$ and 4.7 parts of $Na_2S_2O_8$ in 30 parts of water is added while cooling to 15° C. The solution turns black and highly viscous. After having stirred for half an hour, a fine dispersion is obtained which is applied to a glass substrate. After drying, a black, highly adhesive and scratch resistant coating is obtained which has a specific electrical surface resistivity of $6\times10^2$ ohms.

EXAMPLE 38

50 ml of a poly-DADMAC solution is added dropwise to a 30 percent aqueous solution of $Na_2S_2O_8$ under stirring. The poly-DADMAC which is used has a polymer content of 88 percent, a monomer content of 12 percent, a viscosity of 3026 cPoise and an intrinsic viscosity of 1.71 dl/g. The polymer/peroxo derivative of poly-DADMAC forms quickly as a white precipitate. Stirring is continued for two hours, the precipitate is filtered off, washed with water and methanol and then completely dried at reduced pressure at ambient temperature.

Elementary analysis data indicates a completely ionically cross-linked product with a residual chlorine content of less than 0.08% (chlorine content of poly-DADMAC is 21.95 percent). C:39.74 percent, H:7.57 percent, N:5.9 percent, S:13.2 percent, Na:<0.2 percent.

4 parts of poly-DDAP which has been produced according to the process described above but not dried is pulverized and put into a solution of 12 parts of $NaBF_4$ in 100 parts of water. Methanol and pyrrole have been added to the water to obtain a volume ratio of water:methanol:pyrrole of 100:50:8. The solution is stirred for five hours. The obtained black material is filtered off, washed with water and then with methanol and dried. The product is pressed to a tablet under a pressure of 10 bar. The specific electrical surface resistivity of the tablet is $3\times10^3$ ohms.

EXAMPLE 39

70 parts of a 65 percent aqueous solution of DADMAC is mixed with 6.3 parts of triallylamine and adjusted to a pH of 6 by addition of HCl. The solution is heated to 60° C. and mixed with a solution of 0.115 parts of 2,2'-azobis-(2-amidinopropane)dihydrochloride, commercially available as WAKO-V-50 in 2 parts of water. The solution is stirred for three hours at 60° C. and the highly viscous solution is diluted with 70 parts of water. An additional 0.10 parts of WAKO-V-50 in 2 parts of water is added and the solution is stirred for an additional 6 hours at 60° C.

After cooling, 6.5 g of the highly viscous reaction product is applied to a glass plate of 7.5 cm×7.5 cm and left for two days. The film, which is formed after evaporation of the water, is removed from the glass plate. It has a good mechanical stability. The film has a thickness of 0.5 to 0.7 mm and is put into a 30 percent aqueous $Na_2S_2O_8$ solution. After two hours, the originally colorless film has become white and no portions of the film have been dissolved in the solution. The film is removed from the bath and washed with water and then with methanol.

The film is put in a suspension of 16 g of the sodium salt of p-styrene sulphonic acid in 100 ml of acetonitrile and 12 ml of pyrrole. After 10 hours a deeply black, wet film of extraordinary stability is obtained. The film is washed with methanol. The specific electrical surface resistivity of the film obtained is $5\times10^3$ ohms.

EXAMPLE 40

2 g of poly(2-vinylpyridine) is dissolved in 5 ml of a 16 percent solution of HCl in water and converted to the hydro-chloride form. The viscous solution is applied to a glass substrate of 7.5 cm×2.5 cm. The glass substrate coated with poly-(2-vinylpyridiniumhydrochloride) is put into 100 ml of a saturated solution of potassium peroxodisulphate in water.

After 15 minutes, the glass substrate having a sticky coating of poly(2-vinylpyridiniumperoxodisulphate) which adheres well to the substrate is washed with water and methanol and then put into a bath of cyclohexane containing 5 percent of pyrrole. The film turns black quickly. The coated glass substrate is removed from the bath after 15 minutes and washed with methanol. The specific electrical surface resistivity of the film obtained is $2\times10^4$ ohms.

EXAMPLE 41

6 parts of a 4-vinylpyridine/styrene copolymer, having a styrene content of 10 percent, which is commercially available from Aldrich is dissolved in 35 parts of a 16 weight percent solution of HCl in water and converted to the hydrochloride form. The highly viscous solution is applied to a glass substrate and put into a 20 weight percent aqueous solution of $(NH_4)_2S_2O_8$. The polymer solution is immediately solidified into a white film. The glass substrate containing the film which adheres very well to the substrate is washed with water and methanol and then put into a bath of 100 ml of acetonitrile containing 12 g of $NaBF_4$ and 5 ml of pyrrole. The substrate containing the film is removed from the bath after 2 hours and washed with methanol. The specific electrical surface resistivity of the scratch resistant dry coating obtained is between $10^3$ and $10^4$ ohms.

EXAMPLE 42

6 parts of a 4-vinylpyridine/styrene copolymer, having a styrene content of 10 percent, which is commercially available from Aldrich is dissolved in 35 parts of a 16 weight percent solution of HCl in water and converted to the hydrochloride form. The highly viscous solution is applied to a glass substrate. The water is allowed to evaporate and a coating is obtained. The glass substrate containing the coating which adheres very well to the substrate is put in a 10 weight percent aqueous solution of $(NH_4)_2S_2O_8$. After 2 hours the transparent coating has been converted to a white tough, sticky material and no portions of the coating have been dissolved in the solution. The substrate containing the coating is put into a bath of a mixture of 100 ml of water and 50 ml of methanol containing 6.8 g of sodium dodecylhydrogensulfate and 6 ml of pyrrole. The polymer/peroxo-coating gradually becomes black after about 10 minutes. The substrate containing the black coating is removed from the bath after 5 hours. The coating can be pulled off the substrate in form of a film. The wet film is mechanically stable and flexible but tends to become somewhat brittle when completely dried. The surface of the film which has been exposed to the pyrrole/sodium dodecylhydrogensulfate solution is black and mat and has an electrical resistivity of about $10^3$ ohms. The back side of the film which has adhered to the substrate is black and glossy and has an electrical resistivity of $10^6$ ohms due to the fact that only pyrrole and not the bulky dodecylhydrogensulfate anion could penetrate the film.

EXAMPLE 43

5 parts of the 4-vinylpyridine/styrene copolymer described in Example 41 is dissolved in 100 parts of a 10 weight percent aqueous solution of $HBF_4$. The highly viscous solution is applied to a glass substrate and put into a 10 weight percent solution of $(NH_4)_2S_2O_8$. The polymer solution is solidified into a white film. The glass substrate containing the film is washed with water and put into a mixture or 100 ml of methanol and 60 ml of a 10 weight percent aqueous solution of $HBF_4$ containing 6 g of aniline. The substrate containing the black coating is removed from the mixture after 2 hours and washed with water and methanol. The specific electrical surface resistivity of the coating is $10^3$ ohms.

EXAMPLE 44

4 g of a copolymer produced from 50 mol percent DADMAC and 50 mol percent acrylamide (80 percent DADMAC conversion, molecular weight about 3,000,000) is dissolved in 200 ml of water. 25 ml of a 20 weight percent aqueous $(NH_4)_2S_2O_8$ solution is added at once to the stirred polymer solution. The polymer-peroxo derivative immediately precipitates from the solution in the form of a white gel-like material. 500 ml of acetone is added to the solution in order to complete the polymer precipitation. The product is separated by filtration and washed with $2\times100$ ml of acetone and additionally with 100 ml of acetonitrile. 8.6 g of the wet product is put into a solution of 5.4 g of $NaBF_4$ and 5 ml of pyrrole in 50 ml of acetonitrile. The polymerperoxo derivative gradually turns black within 40 minutes. The product is washed with methanol, dried and pressed to a tablet. The specific electrical surface resistivity of the tablet is $4\times10^4$ ohms.

EXAMPLE 45

Preparation of poly.
(p-xylylene-a-dimethylsulfonium chloride.).

a) Production of the monomer
The production of a compound of the formula

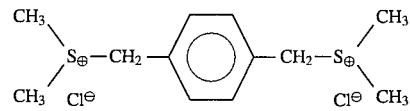

(p-xylylene-α-dimethylsulfonium chloride) and its polymerization are known. 13.1 g of p-xylylene dichloride and 55 ml of dimethylsulfide are heated overnight to 55° C. in 100 ml of methanol. The solvent is removed. 50 ml of acetone is added. Upon removal of the solvent, crystalline xylylene-α-dimethylsulfonium chloride is obtained which is dried at 40° C. under vacuum.

b) Polymerization 15 g of xylylene-α-dimethylsulfonium chloride is added to 150 ml of water and cooled to 0° C. 2.6 g of NaOH in 150 ml of water at a temperature of 0° C. are added within 5 minutes. The reaction mixture becomes viscous after 5 to 10 minutes. After 1 hour at 0° C., the reaction mixture is quenched with 15 ml of concentrated HCl.

Preparation of an electrically conductive film 0.6 g of a purified aqueous 10 wt.% solution of poly (p-xylylene-α-dimethylsulfonium chloride) is evenly applied to a substrate made of glass having a surface of 7.5 cm×2.5 cm. The coated substrate is put in 100 ml of an aqueous 10 wt. % solution of $(NH_4)_2S_2O_8$. The polyelectrolyte is quickly solidified to a white film. The film is left for 15 minutes in the peroxydisulfate solution, removed therefrom and washed with water.

The produced polymeric peroxydisulfate is put in a bath of 10.5 g of benzene sulphonic acid, 2.4 g NaOH, 50 ml of water, 25 ml of methanol and 25 ml of ethanol to which 10 g of pyrrole is added. The film turns black immediately.

After 20 minutes the film is removed from the bath and washed with methanol. The solvent is allowed to evaporate. The surface resistivity of the dried film which shows a good adherence to the glass surface is $5 \times 10^2$ ohms.

The dry coated substrate is put on a metallic plate which has been pretreated to 100° C. The temperature is kept for 3 minutes. The black film turns partially blue. Its surface resistivity is $7 \times 10^2$ ohms at room-temperature. The coating is resistant to water and organic solvents.

EXAMPLE 46

A film of the polymeric peroxydisulfate prepared as described in Example 45 is fixed in a glass container near the top. The glass container contains liquid pyrrole which is not in direct contact with the film. A few minutes after the container has been closed, the reaction between the film and the pyrrole gas phase occurs and the polymer film turns black. After 5 hours the film is removed from the container together with the glass substrate and the film is dipped in a wash solution of methanol/water 1:1. Then the wet film together with the substrate is put on a heater of 95° C. and left for about 5 minutes. The dry grey-black coating has a surface resistivity of $2 \times 10^4$ ohms.

EXAMPLE 47

A balck but wet polypyrrole/polyelectrolyte coated substrate prepared as described in Example 45 is put on a heating plate. The plate is heated to 100° C. and the coating is left there for about 3 minutes until the color of the coating turns dark blue. The surface resistivity of the coated substrate is $8 \times 10^2$ ohms at room temperature.

EXAMPLE 48

A film of polymeric peroxydisulfate prepared as described in Example 45 is put in 10 wt. % aqueous solution of aniline hydrochloride. The film turns dark after a few minutes. The film and the substrate are removed from the bath after 15 minutes, dipped in a wash-water solution and heated to 95° C. on a metallic heating plate. After dimethylsulfide has been split off, a green-yellow coating having a surface resistivity of $1 \times 10^3$ ohms at room temperature is obtained.

EXAMPLE 49

Use of a coating prepared from poly-DDAP and pyrrole as an electrode material

The scratch resistant and abrasive resistant coating prepared from poly-DDAP and pyrrole on a glass substrate of 7.5 cm×2.5 cm produced according to Example 28 is used as an anode. A platinum electrode of 2 cm×4 cm and 0.1 mm thickness is used as a cathode. The electrolyte consists of a 0.1 molar solution of tetrabutylammoniumtetrafluoroborate in 100 ml of acetonitrile which additionally contains pyrrole at a concentration of 1 molar. The electrodes are located in a closed container used for electrolysis at a distance of about 2.5 cm. The portion of the surface of the electrodes which is dipped into the solution is about 2 cm×2.5 cm. A potential of 20 volts is applied for about 4½ hours. The coated substrate is taken out of the bath, washed with methanol and dried under reduced pressure at ambient temperature. The electrical surface resistivity of the coating which has not been in direct contact with the electrolyte is $9 \times 10^4$ ohms. The surface of the coating which has been located in the electrolyte is coated with a layer of anodically deposited polypyrrole, its electrical surface resistivity being 140 ohms. This portion of the coating can be removed from the substrate as a thin, black, mechanically stable, flexible film.

COMPARATIVE EXAMPLE

Example 49 is repeated, however a platinum electrode is used as an anode instead of a glass substrate coated with the coating produced from poly-DDAP and pyrrole. A second platinum electrode, which has been described in Example 49, is used as a cathode. The distance between the two electrodes and the type of electrolyte solution are the same as in Example 49. The electrochemical deposition of pyrrole (concentration 1 molar) is carried out at a potential of 1.5 volts. After one hour, a portion of the platinum electrode is coated with a black film of polypyrrole. After an additional hour, the platinum electrode is removed from the bath and any conducting salt which still adheres to the deposited polypyrrole is removed with methanol. The coated electrode is then dried. It has an electrical surface resistivity of 32 ohms. It is not possible to remove polypyrrole produced under these conditions from the electrode in the form of a self-supporting film.

EXAMPLE 50

The mechanically stable wet poly-DDAP film prepared from poly-DADMAC and $Na_2S_2O_8$ according to Example 39 is used as an anode. A platinum electrode as described in Example 49 is used as an cathode. The electrolysis is carried out as described in Example 49, but 300 ml of acetonitril containing tetrabutylammoniumtetrafluoroborate at a concentration of 0.1 molar and pyrrole at a concentration of 0.5 molar is used as an electrolyte. As soon as the poly-DDAP film is dipped into the bath, it becomes black and conductive. The film is switched as an anode and a voltage of 4.5 volt is applied for about 10 minutes. The voltage is then decreased to 2.2 volt for 1.5 hours. The electrical conductivity of the film is 0.7 S/cm (measured by four-point measurement).

I claim:

1. Electrically conductive polymer particles having an average size of 5 nm to 1 mm and comprising i) a core of an electrically conductive polymer a) containing one or more oxidatively polymerizable aromatic compounds and ii) a coating of a polymer d) having ammonium, phosphonium or sulfonium groups in the polymer chain(s), wherein the weight of the coating is up to about 25 percent, based on the total weight of a) and d).

2. The polymer particles of claim 1 wherein the oxidatively polymerizable aromatic compound in polymer a) is selected from the group consisting of pyrroles, thiophenes and anilines.

3. The polymer particles of claim 1 wherein polymer d) is a homo- or copolymer of one or more monomers of Formula I

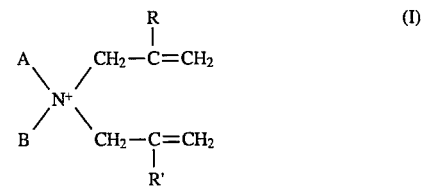

wherein

A and B are the same or different and represent a $C_{1-12}$-alkyl or phenyl radical, either unsubstituted or having one or more substituents which are not polymerizable in the presence of a free radical initiator; or A and B together represent —$CH_2$—$CH_2$—$CH(CH_3)$—$CH(CH_3)$—, —CH=CH—CH=CH—, —CH=CH—CH=N—, or —CH=CH—N=CH—; and R and R' are the same or different and represent hydrogen, unsubstituted $C_{1-6}$-alkyl, unsubstituted phenyl, nitro-$C_{1-6}$-alkyl, substituted $C_{1-6}$-alkyl or substituted phenyl, the substituents being selected from the group of hydroxy, amido, loweralkoxyl, phenoxy, naphthoxy, cyano, thioloweralkoxy, thiophenoxy, loweralkoyl and 5- or 6-membered cycloalkyl.

4. The polymer particles of claim 3 wherein A and B in Formula I each independently represent methyl, ethyl or unsubstituted phenyl and R and R' independently are hydrogen or methyl.

5. The polymer particles of claim 4 wherein A and B in Formula I represent methyl and R and R' independently are hydrogen or methyl.

6. The polymer particles of claim 1 wherein the aromatic compound is a substituted or unsubstituted aniline.

7. The polymer particles of claim 1 wherein the aromatic compound is selected from the group of thiophenes and pyrroles.

8. The polymer particles of claim 1 wherein the particles have an average size of 10 nm to 0.1 mm.

9. A polymer composition comprising a polycarbonate or chlorinated polyethylene and, as a filler, electrically conductive polymer particles having an average size of 5 nm to 1 mm and comprising i) a core of an electrically conductive polymer a) containing one or more oxidatively polymerizable aromatic compounds and ii) a coating of a polymer d) having ammonium, phosphonium or sulfonium groups in the polymer chain(s), wherein the weight of the coating is up to about 25 percent, based on the total weight of a) and d).

10. The polymer particles of claim 1, wherein polymer d) contains sulfate groups as counter-ions.

* * * * *